(12) United States Patent
Smirnov et al.

(10) Patent No.: US 8,069,457 B2
(45) Date of Patent: Nov. 29, 2011

(54) AUTO-BALANCING DEVICE, TURNTABLE DEVICE, AND DISC DRIVING DEVICE

(75) Inventors: Viatcheslav Smirnov, Suwon-si (KR); Pyo Kim, Suwon-si (KR); Nam-Seok Kim, Osan-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 821 days.

(21) Appl. No.: 12/081,598

(22) Filed: Apr. 17, 2008

(65) Prior Publication Data

US 2009/0125930 A1    May 14, 2009

(30) Foreign Application Priority Data

Nov. 12, 2007    (KR) .......... 10-2007-0114889

(51) Int. Cl.
*G11B 17/028*    (2006.01)
(52) U.S. Cl. .......... 720/702; 720/698; 720/703
(58) Field of Classification Search .......... 720/695–717; 360/98.07, 98.08, 99.04, 99.08–99.12
See application file for complete search history.

(56) References Cited

U.S. PATENT DOCUMENTS

| | | | |
|---|---|---|---|
| 6,198,715 B1 * | 3/2001 | Kouno et al. | 720/702 |
| 6,510,122 B1 * | 1/2003 | Yamauchi et al. | 369/266 |
| 2004/0111737 A1 * | 6/2004 | Masaki et al. | 720/715 |
| 2004/0232781 A1 * | 11/2004 | Yoo | 310/51 |
| 2004/0268376 A1 * | 12/2004 | Yoo et al. | 720/702 |

FOREIGN PATENT DOCUMENTS

| | | | |
|---|---|---|---|
| JP | 11306629 A | * | 11/1999 |
| KR | 10-300636 | | 9/2001 |
| KR | 10-2004-0080654 | | 9/2004 |

OTHER PUBLICATIONS

Machine-Assisted Translation of JP 11306629 A.*
Korean Office Action issued on Mar. 26, 2009 in corresponding Korean Patent Application 10-2007-0114889.

* cited by examiner

*Primary Examiner* — Nathan Danielsen

(57) ABSTRACT

An auto-balancing device, as well as a turntable device and a disc driving device equipped with the auto-balancing device are disclosed. The auto-balancing device, which includes a housing, which is coupled with a rotating body, and in which an annular insertion groove is formed; a correcting ring, rotatably inserted in the insertion groove; and multiple correcting balls, positioned between the correcting ring and an outward inwall of the insertion groove, can reduce noise and vibration for a rotating body during acceleration and deceleration and during high-speed rotations.

18 Claims, 37 Drawing Sheets

AUTO-BALANCING DEVICE, TURNTABLE DEVICE, AND DISC DRIVING DEVICE

CROSS-REFERENCE TO RELATED APPLICATIONS

This application claims the benefit of Korean Patent Application No. 10-2007-0114889 filed with the Korean Intellectual Property Office on Nov. 12, 2007, the disclosure of which is incorporated herein by reference in its entirety.

BACKGROUND

1. Technical Field

The present invention relates to an auto-balancing device, and to a turntable device and a disk driving device equipped with the auto-balancing device.

2. Description of the Related Art

Recent developments in electronics have led to the use of high-capacity information storage apparatus, such as the CD (compact disc), DVD (digital versatile disc), BD (Blu-ray disc), HD DVD (high definition DVD), etc. Accordingly, there is also a demand for high-speed rotations in the disc drive, which is a device for operating such storage apparatus.

FIG. 1 is a cross-sectional view illustrating an optical disc drive motor according to the related art. Referring to FIG. 1, the motor 10 may be equipped with a turntable device 20. While the motor 10 according to the related art may not provide any problems for rotations at low speeds, but for high speed rotations, the motor 10 may cause serious problems. The centrifugal force applied to a rotating object increases quadratically with respect to the increase in rotation speed. Thus, an increase in the rotation speed of the motor 10 is correlated with an increase in vibration.

The more the rotation speed of the motor 10 is increased, the greater will be the degree of unbalanced centrifugal force, where the resulting vibration may cause difficulty in reading or writing information from or to a disc. Although recent developments in motor-manufacturing techniques have reduced manufacturing tolerances, etc., to increase precision in the products, this is correlated with a rise in manufacturing costs.

FIG. 2 is a cross-sectional view illustrating an optical disc drive motor installed with a turntable device according to the related art. Referring to FIG. 2, a turntable device 30 equipped with an auto-balancing device according to the related art may include multiple correcting balls 32 in a ring-shaped insertion groove. During low-speed rotations, the positions of the correcting balls 32 may be random. After the rotation speed exceeds a certain level, the correcting balls 32 may be distributed evenly across the insertion groove, due to centrifugal forces. In an unbalanced state, the distribution of the correcting balls 32 may be temporarily concentrated in a particular area to resolve this unbalance.

However, at around the resonance point, a phenomenon may occur, in which the correcting balls do not halt within the insertion groove but instead continue to rotate, where this phenomenon is liable to cause problems in operation. Moreover, the correcting balls may act as a dead load in cases where the rotating shaft of the motor forms an angle with the direction of gravity, and problems of noise and vibration may occur during acceleration or deceleration, when the correcting balls collide with one another.

SUMMARY

An aspect of the invention provides an auto-balancing device, as well as a turntable device and a disc driving device equipped with the auto-balancing device, which can reduce noise and vibration for a rotating body during acceleration and deceleration and during high-speed rotations.

Another aspect of the invention provides an auto-balancing device that includes: a housing, which is coupled with a rotating body, and in which an annular insertion groove is formed; a correcting ring, rotatably inserted in the insertion groove; and multiple correcting balls, positioned between the correcting ring and an outward inwall of the insertion groove.

Here, an outer perimeter of the correcting ring can be in contact with the correcting balls, while an inner perimeter of the correcting ring can be separated from an inward inwall of the insertion groove. The outer perimeter of the correcting ring may be inclined towards an open part of the insertion groove, and a recessed portion may be formed in an inner perimeter of the correcting ring. Also, one or more first protrusions can be formed on an outer perimeter of the correcting ring to induce a movement of the correcting balls, and one or more second protrusions can be formed on an outer perimeter of the correcting ring in predetermined intervals such that the insertion groove is segmented.

The outward inwall of the insertion groove may be curved, such that an open part of the insertion groove expands towards an outer side. The auto-balancing device may further include a sliding disc that covers the insertion groove and supports the correcting balls such that the correcting balls tilt outwards.

Still another aspect of the invention provides a turntable device for detachably securing a disc to a motor, which includes: a cone part, which can be inserted through an inner perimeter of the disc so as to secure the disc; a support part, coupled with a rotating shaft of the motor and extending to an outward side of the cone part so as to support the disc; an annular insertion groove, formed in the support part; a correcting ring, rotatably inserted in the insertion groove; and multiple correcting balls, positioned between the correcting ring and an outward inwall of the insertion groove.

Here, an outer perimeter of the correcting ring can be in contact with the correcting balls, while an inner perimeter of the correcting ring can be separated from an inward inwall of the insertion groove. The outer perimeter of the correcting ring may be inclined towards an open part of the insertion groove, and a recessed portion may be formed in an inner perimeter of the correcting ring. Also, one or more first protrusions can be formed on an outer perimeter of the correcting ring to induce a movement of the correcting balls, and one or more second protrusions can be formed on an outer perimeter of the correcting ring in predetermined intervals such that the insertion groove is segmented.

The outward inwall of the insertion groove may be curved, such that an open part of the insertion groove expands towards an outer side. The turntable device may further include a sliding disc that covers the insertion groove and supports the correcting balls such that the correcting balls tilt outwards.

Yet another aspect of the invention provides a disc driving device that includes: a motor, which generates a driving force; a cone part, which can be inserted through an inner perimeter of the disc so as to secure the disc; a support part, coupled with a rotating shaft of the motor and extending to an outward side of the cone part so as to support the disc; an annular insertion groove, formed in the support part; a correcting ring, rotatably inserted in the insertion groove; and multiple correcting balls, positioned between the correcting ring and an outward inwall of the insertion groove.

Here, an outer perimeter of the correcting ring can be in contact with the correcting balls, while an inner perimeter of the correcting ring can be separated from an inward inwall of the insertion groove. The outer perimeter of the correcting ring may be inclined towards an open part of the insertion groove, and a recessed portion may be formed in an inner perimeter of the correcting ring. Also, one or more first protrusions can be formed on an outer perimeter of the correcting ring to induce a movement of the correcting balls, and one or more second protrusions can be formed on an outer perimeter of the correcting ring in predetermined intervals such that the insertion groove is segmented.

The outward inwall of the insertion groove may be curved, such that an open part of the insertion groove expands towards an outer side. The disc driving device may further include a sliding disc that covers the insertion groove and supports the correcting balls such that the correcting balls tilt outwards.

Additional aspects and advantages of the present invention will be set forth in part in the description which follows, and in part will be obvious from the description, or may be learned by practice of the invention.

DETAILED DESCRIPTION

Figure 1:
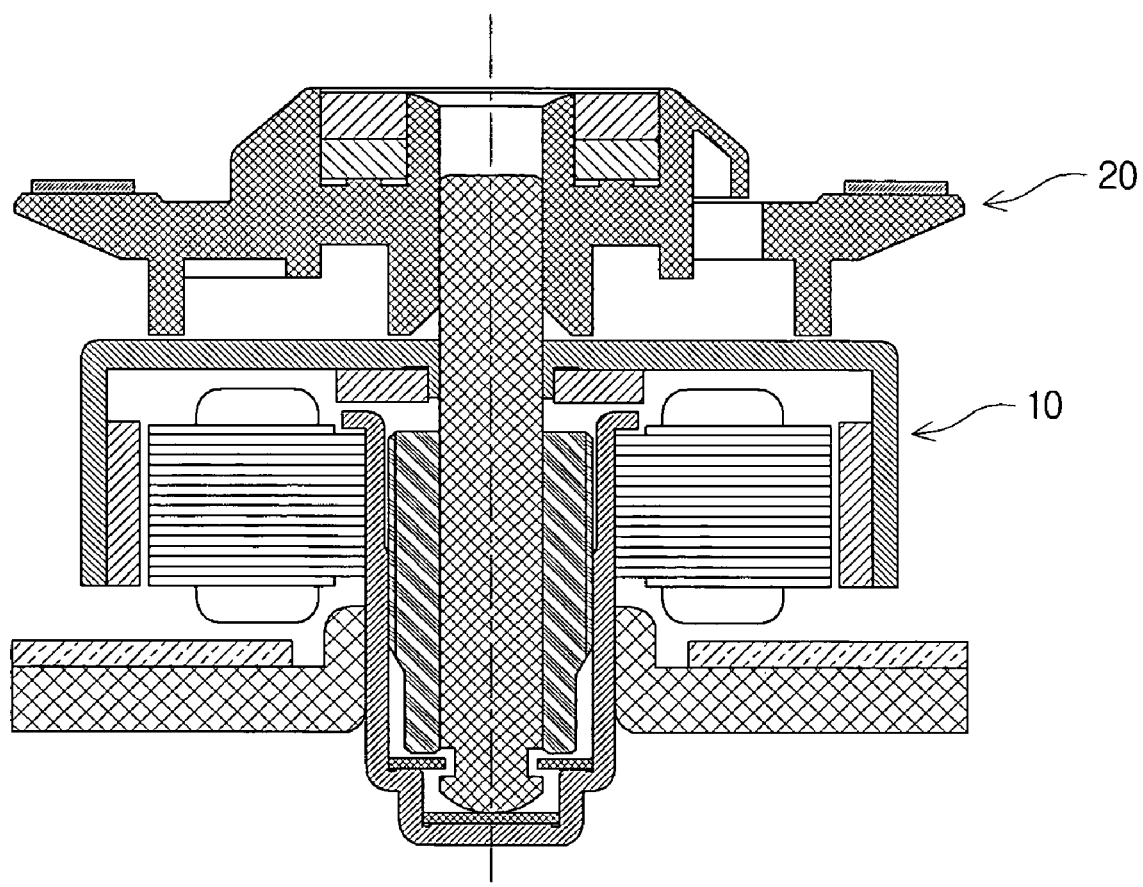
FIG. 1 is a cross-sectional view illustrating a disc driving device according to the related art.
Figure 2:
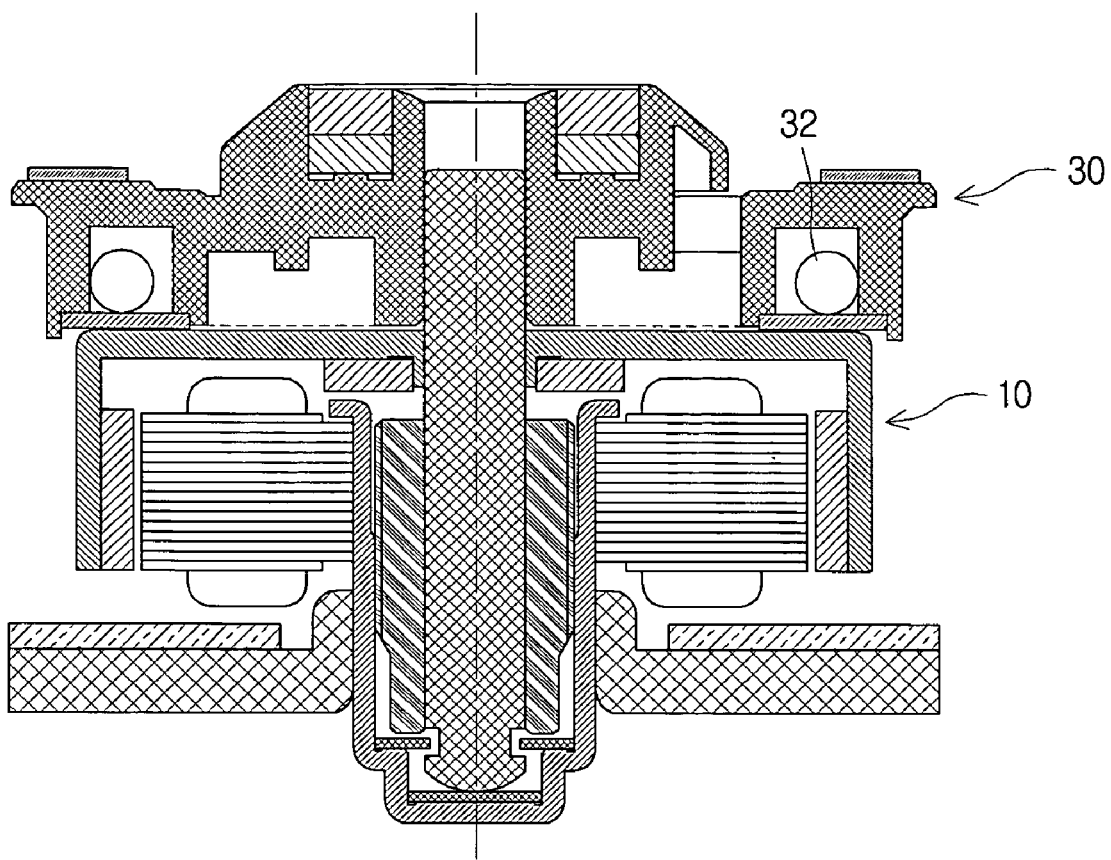
FIG. 2 is a cross-sectional view illustrating a disc driving device installed with an auto-balancing device according to the related art.

Certain embodiments of the invention will be described below in more detail with reference to the accompanying drawings. Those components that are the same or are in correspondence are rendered the same reference numeral regardless of the figure number, and redundant explanations are omitted.

Figure 3:
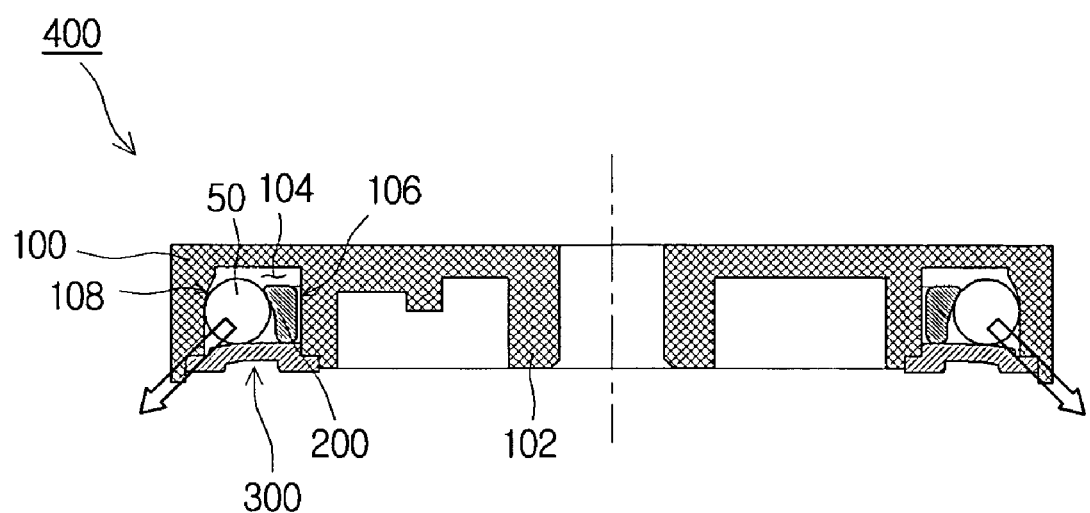
FIG. 3 is a cross-sectional view illustrating an auto-balancing device according to a first disclosed embodiment of the invention.

FIG. 3 is a cross-sectional view illustrating an auto-balancing device 400 according to a first disclosed embodiment of the invention. In FIG. 3, there are illustrated correcting balls 50, a housing 100, a boss 102, an insertion groove 104, a correcting ring 200, a sliding disc 300, and an auto-balancing device 400.

An auto-balancing device 400 according to this embodiment may include a housing 100, which may be coupled with a rotating body, and in which an annular insertion groove 104 may be formed; a correcting ring 200, which may be rotatably inserted in the insertion groove 104; and multiple correcting balls 50, interposed between the correcting ring 200 and an outward inwall of the insertion groove 104. The auto-balancing device 400 can reduce noise and vibration when the rotating body undergoes acceleration, deceleration, or high-speed rotations.

The auto-balancing device 400 may be coupled to a rotating body. The rotating body can be, for example, a motor 600. The auto-balancing device 400 may be coupled to the rotating shaft 602 of the motor 600. Also, the auto-balancing device 400 may be fabricated as an integrated body with the motor 600, and in certain cases, such as for the case of an optical disc drive motor 600, may be fabricated as an integrated body with a turntable device 500 to be coupled with the motor 600.

Figure 4:
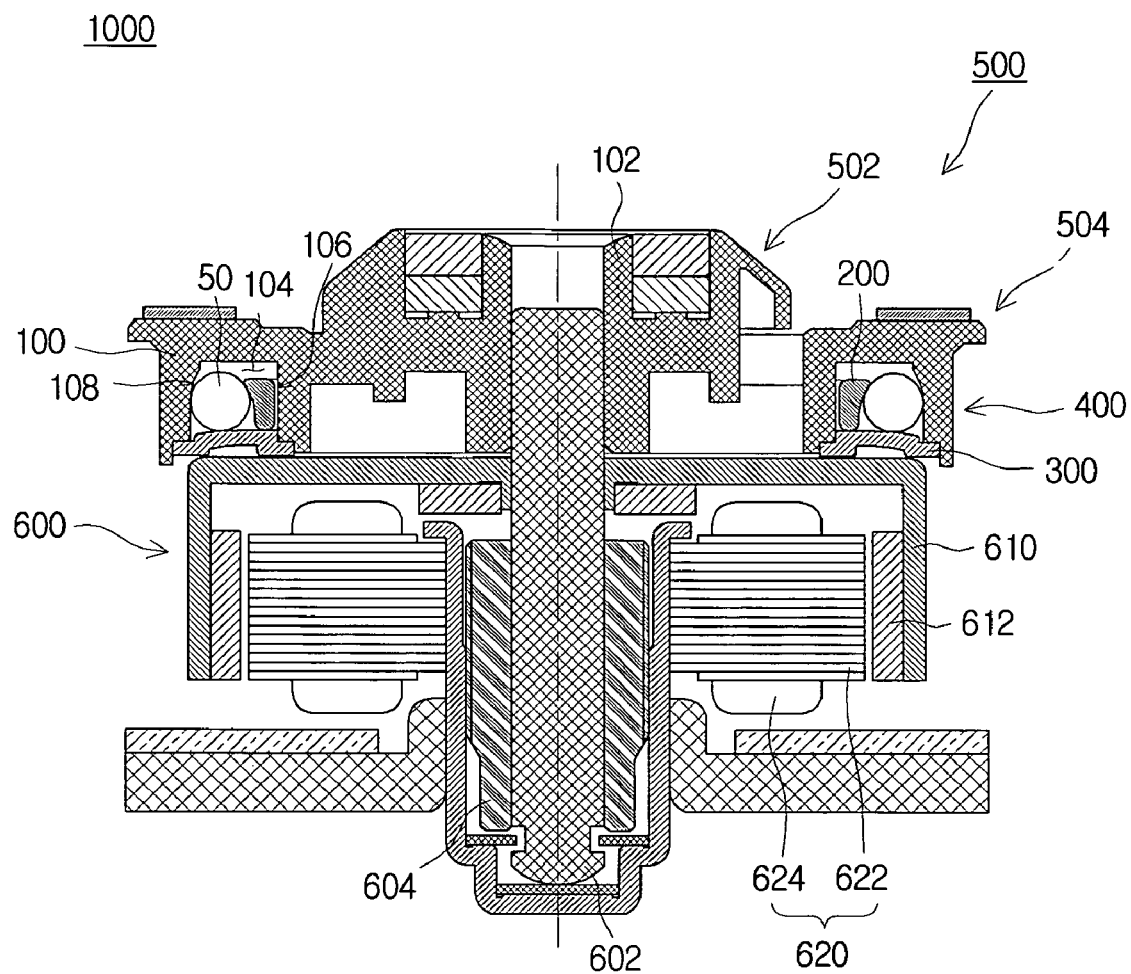
FIG. 4 is a cross-sectional view illustrating a disc driving device according to a second disclosed embodiment of the invention.

As shown in FIG. 4, the housing 100 may be coupled with a rotating body, and annular insertion groove 104 may be formed in the housing 100. A boss 102 formed in a center of the housing 100 can be the portion that is coupled with the rotating body. The annular insertion groove 104 may have an inward inwall 106 and an outward inwall 108. The portion surrounded by the inward inwall 106 and outward inwall 108 may form the annular insertion groove 104. The outward inwall 108 of the insertion groove 104 can be curved such that the open part of the insertion groove 104 expands towards the outside.

The open part of the insertion groove 104 refers to the open area opposite the bottom surface of the insertion groove 104 before a sliding disc 300, described later, is coupled on. The curved outward inwall 108 of the insertion groove 104 can stabilize the movement of the spherical correcting balls 50. One reason for this is because, during the rotation of the auto-balancing device 400, the centrifugal forces are applied on the correcting balls 50 in directions toward the open part of the insertion groove 104, so that the correcting balls 50 can be kept in particular positions in relation to one another.

A correcting ring 200 may be rotatably inserted in the insertion groove 104. The correcting ring 200 can be inserted such that the outer perimeter of the correcting ring 200 is in contact with the correcting balls 50 while the inner perimeter of the correcting ring 200 is separated from the inward inwall 106 of the insertion groove 104, to allow the correcting ring 200 to rotate. In particular, the outer perimeter of the correcting ring 200 may be inclined in a direction towards the open part of the insertion groove 104. The inclined outer perimeter of the correcting ring 200 may direct the centrifugal forces applied on the correcting balls 50 toward the lower side of the auto-balancing device 400, so that the correcting balls 50 remain by the outward inwall 108 of the insertion groove 104. The correcting ring 200 can be made of a plastic or metallic material.

A sliding disc 300 may cover the insertion groove 104 and support the correcting balls 50 such that they tilt outwards. The portion touching the correcting ring 200 on the inner side of the sliding disc 300 can be formed flat, and the portion touching the correcting balls 50 can support the correcting balls 50 such that they tilt outwards. This means that the sliding disc 300 may be formed to incline downwards from the inward side towards the outward side. The sliding disc 300 may also assist in having the correcting balls 50 remain by the inclined portion of the sliding disc 300, during the rotation of the rotating body, to thereby restrict the movement of the correcting balls 50. The sliding disc 300 may seal the insertion groove 104, to provide a clean environment for the operation of the correcting balls 50 and correcting ring 200. Also, the sliding disc 300 may include a lubrication layer on the surface, an example of which can be a hard metal coating layer.

As described above, an auto-balancing device 400 according to this embodiment restricts the correcting balls 50 to a lower corner of the auto-balancing device 400, when the rotating body is rotating, to stabilize the movement of the correcting balls 50 and to reduce noise and vibration.

Figure 5:
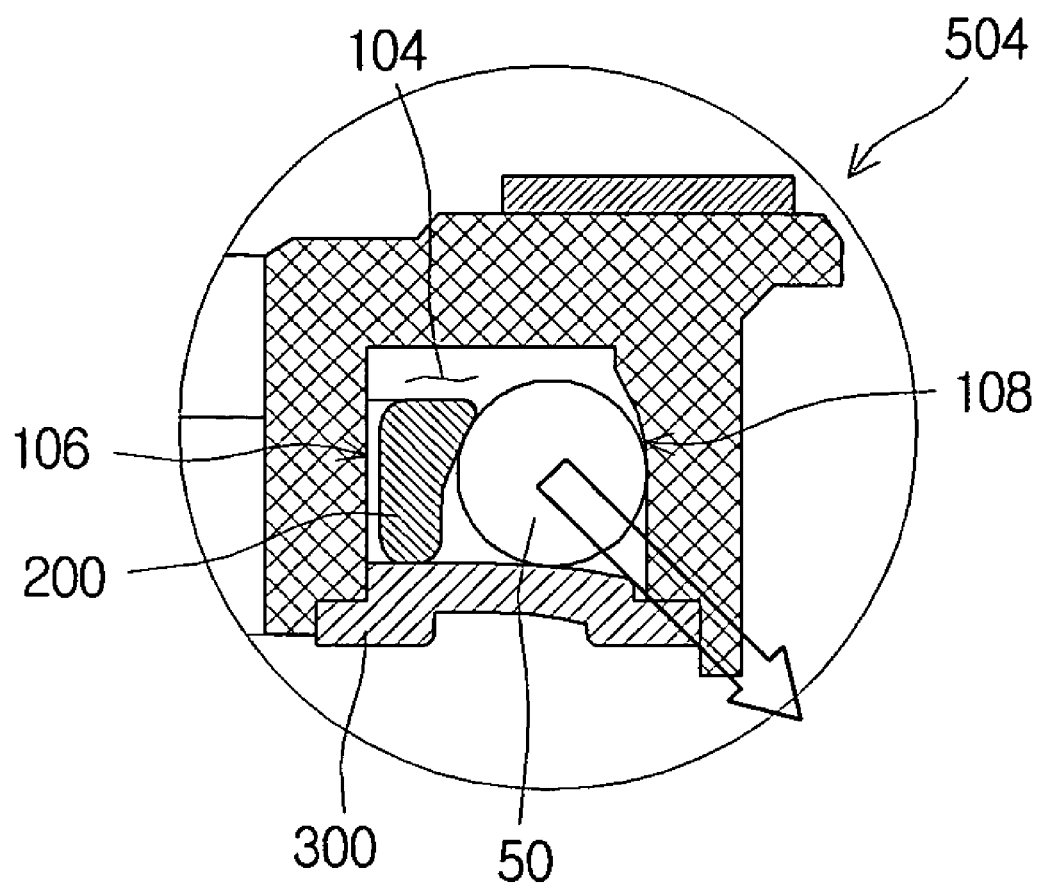
FIG. 5 is a partial cross-sectional view illustrating a disc driving device according to a second disclosed embodiment of the invention.
Figure 6:
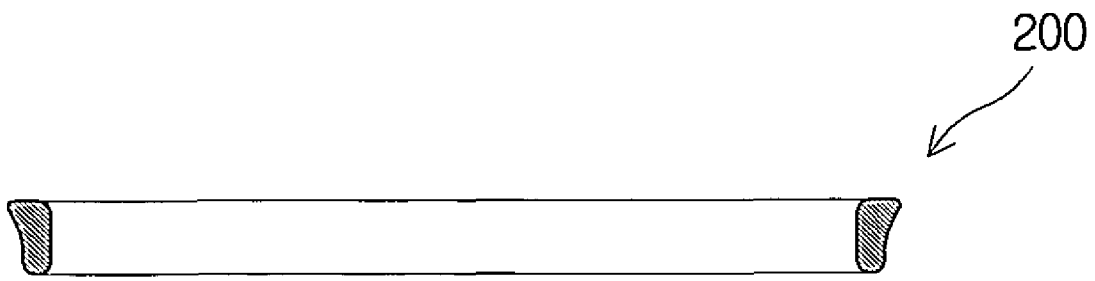
FIG. 6 is a cross-sectional view illustrating a correcting ring according to a second disclosed embodiment of the invention.
Figure 7:
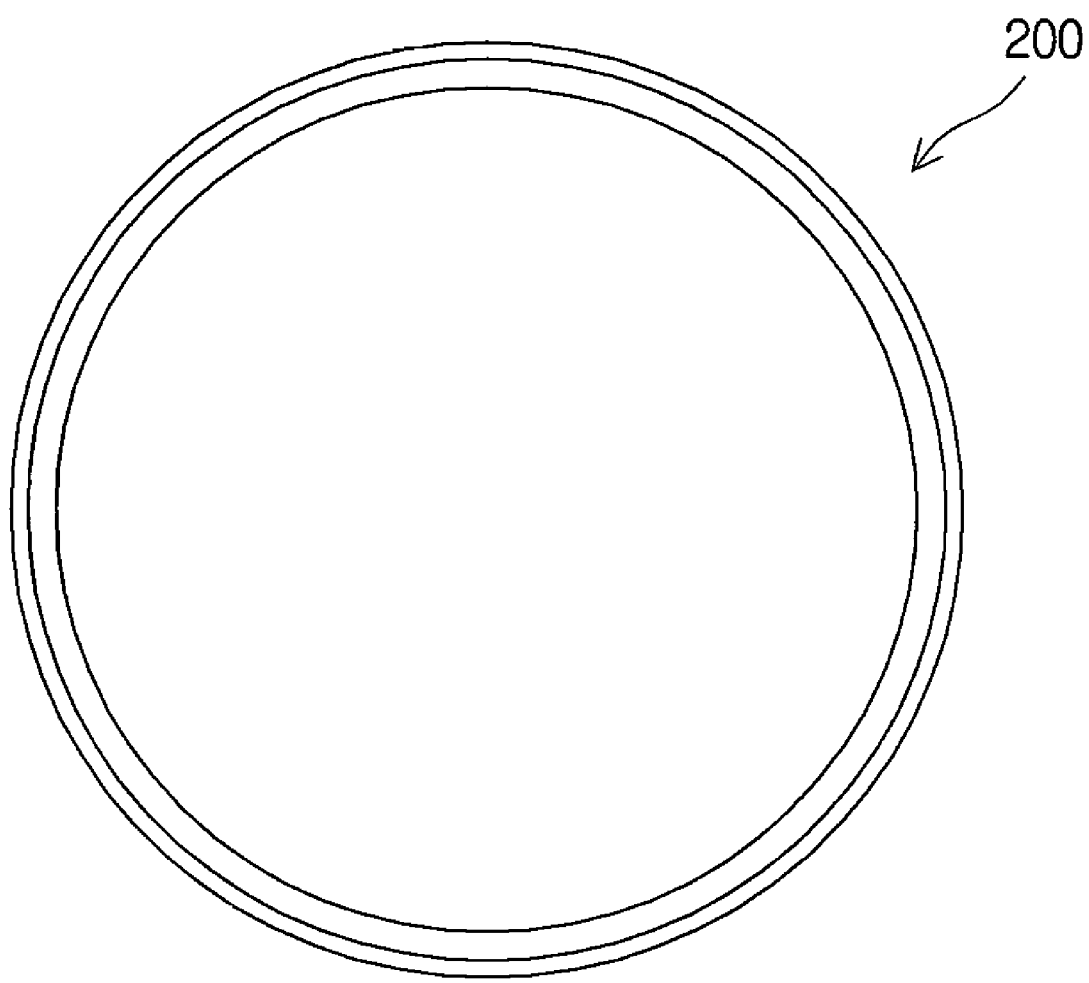
FIG. 7 is a bottom view illustrating a correcting ring according to a second disclosed embodiment of the invention.

FIG. 4 is a cross-sectional view illustrating a disc driving device 1000 according to a second disclosed embodiment of the invention, and FIG. 5 is a partial cross-sectional view illustrating a disc driving device 1000 according to the second disclosed embodiment of the invention. FIG. 6 is a cross-sectional view illustrating a correcting ring 200 according to the second disclosed embodiment of the invention, and FIG. 7 is a bottom view illustrating a correcting ring 200 according to the second disclosed embodiment of the invention. In FIGS. 4 to 7, there are illustrated first protrusions 202, second protrusions 204, a turntable device 500, a cone part 502, a support part 504, a motor 600, a rotating shaft 602, a sleeve 604, a rotor 610, magnets 612, a stator 620, teeth 622, coils 624, and a disc driving device 1000.

A disc driving device 1000 according to this embodiment can be a device for driving a disc, and can include a motor 600, which may generate a driving force; a cone part 502, which may be inserted through an inner perimeter of the disc such that the disc is secured; a support part 504, which may be coupled with a rotating shaft 602 of the motor 600, and which may extend to an outward side of the cone part 502 to support the disc; an annular insertion groove 104, which may be formed in the support part 504; a correcting ring 200, which may be rotatably inserted in the insertion groove 104; and multiple correcting balls 50, which may be positioned between the correcting ring 200 and an outward inwall 108 of the insertion groove 104.

The disc driving device 1000 may include a motor 600 and a turntable device 500, where the turntable device 500 can be a device for detachably securing a disc to the motor 600 that includes the cone part 502 inserted through an inner perimeter of the disc such that the disc is secured, the support part 504 coupled with the rotating shaft 602 of the motor 600 and extending to an outward side of the cone part 502 to support the disc, the annular insertion groove 104 formed in the support part 504, the correcting ring 200 rotatably inserted in the insertion groove 104, and the correcting balls 50 interposed between the correcting ring 200 and the outward inwall 108 of the insertion groove 104.

The motor 600 can be a device for providing a driving force to the turntable device 500, and can be divided mainly into a rotor 610, which may be coupled to the turntable device 500 to rotate together with the turntable device 500, and a stator 620, which may provide a rotational force to the rotor 610.

The stator 620 may include teeth 622 secured to a core, and coils 624 secured around the perimeters of the teeth 622. At an inner part of the teeth 622, a sleeve 604 may be included, which may support the rotating shaft 602 and allow smoother rotation. An electric current can be inputted to the coils 624, whereby an electrical field may be formed. The coils 624 can be arranged adjacent to magnets 612, which may be affixed to the rotor 610. The rotating shaft 602 may rotate together with the rotor 610 and may serve to transfer the rotational force to the turntable device 500.

The rotor 610 may rotate together with the rotating shaft 602 and the turntable device 500, and may have a generally circular horizontal cross section. The rotor 610 may be open downwards, and may include a cover portion that may be in contact with the turntable device 500. The cover portion can generally be shaped as a circular plate, with an upper surface of the cover portion in contact with the turntable device 500.

The rotating shaft 602 may be inserted through the cover portion, while a boss 102 on the turntable device 500 may be inserted on and secured to the outer side of the insertion portion. In this way, the driving force of the rotating shaft 602 may be transferred to the turntable device 500.

The turntable device 500 may be a device for securing a disc, etc., in which information may be inputted, to a driving body such as a motor 600, etc. The cone part 502 can be the portion inserted through the inner perimeter of the disc, in order to secure the disc. The cone part 502 can be made of an elastic material. The support part 504 may be coupled with the rotating shaft 602 of the motor 600, and may extend outwards of the cone part 502 to support the disc. The disc inserted onto the cone part 502 may be mounted on a disc-mounting surface of the support part 504 and secured to the turntable device 500.

As shown in FIG. 5, a disc driving device 1000 according to this embodiment, when driving the disc, may cause the centrifugal forces to be applied on the correcting balls 50 in particular directions (such as in the direction of the arrow shown in FIG. 5), to have the correcting balls 50 remaining in particular positions in relation to one another. In this way, problems of noise and vibration caused by the correcting balls 50 during high-speed rotations or during acceleration or deceleration can be reduced. Also, even in cases where the rotating shaft 602 is at an angle with the direction of gravity, the correcting ring 200 and the correcting balls 50 can be in contact with each other, whereby the friction between the correcting ring 200 and the correcting balls 50 may quickly raise the correcting balls 50 and position the correcting balls 50 across the entire insertion groove 104.

As shown in FIGS. 6 and 7, the correcting ring 200 according to this embodiment can be formed such that the outer perimeter is inclined towards the open part of the insertion groove 104. One reason for this is to maintain contact with the correcting balls 50, when the disc driving device 1000 is in a balanced state or an unbalanced state.

Figure 8:
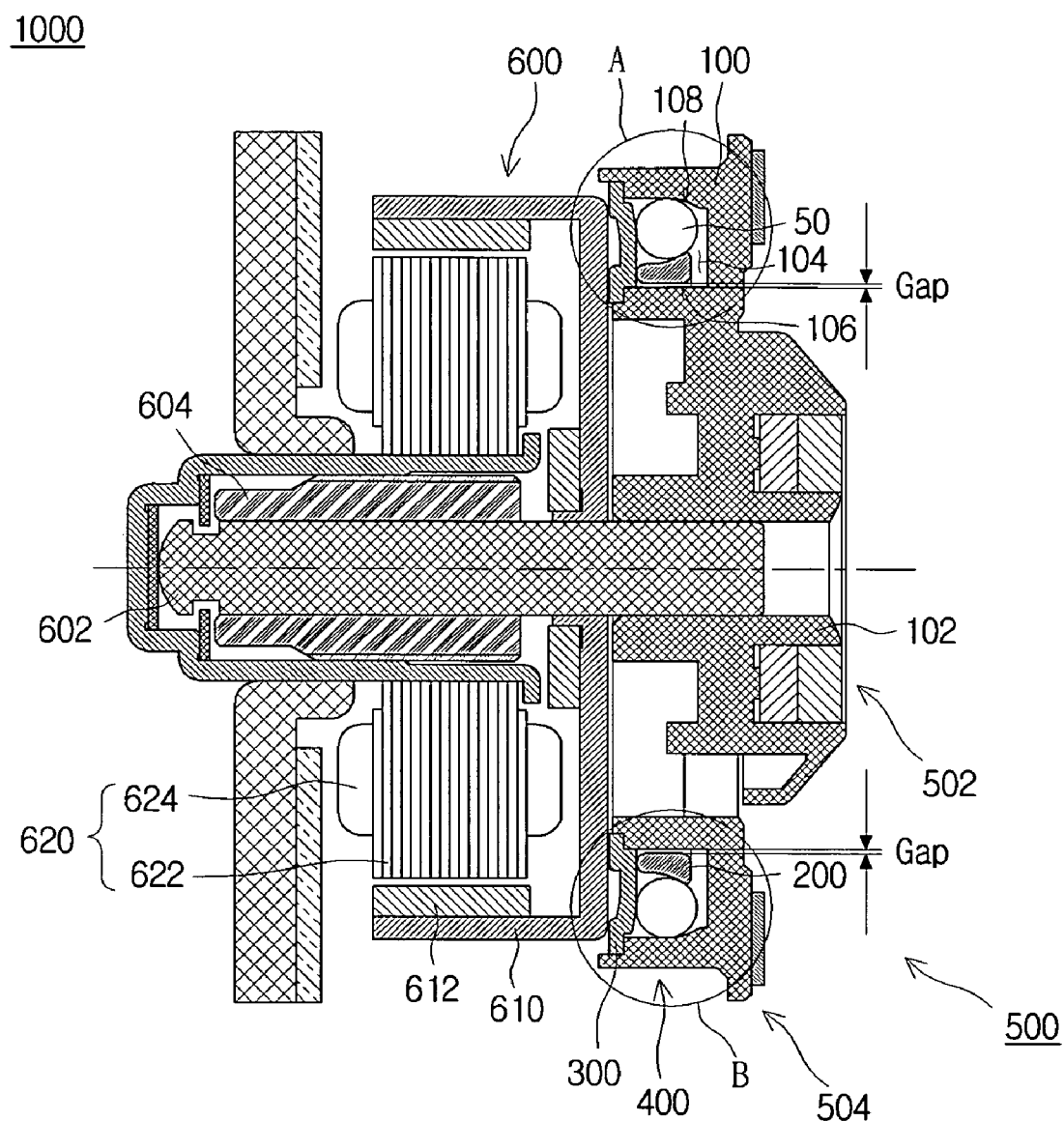
FIG. 8 is a cross-sectional view illustrating a disc driving device according to a second disclosed embodiment of the invention, in a balanced state.
Figure 9:
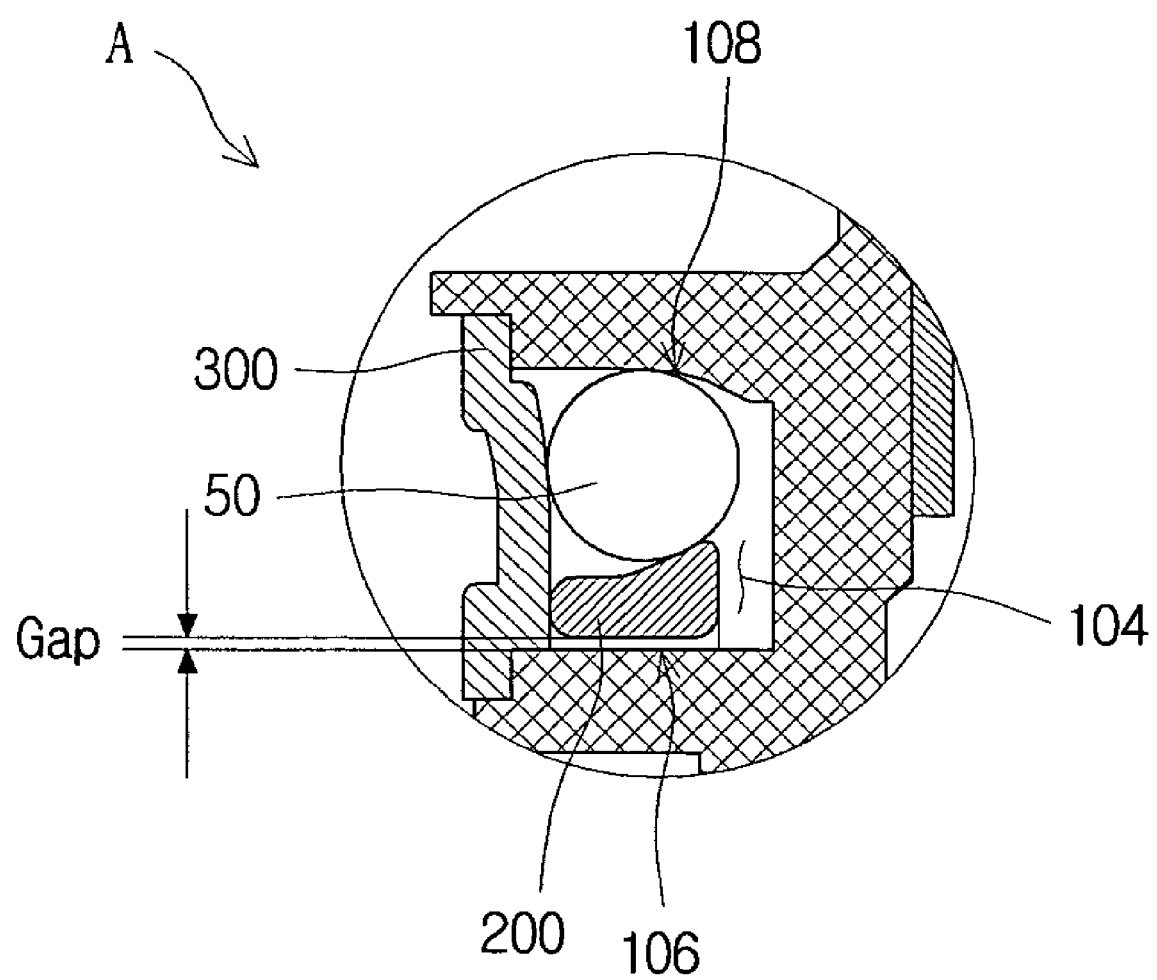
FIG. 9 is a partial cross-sectional view of portion A in FIG. 8.
Figure 10:
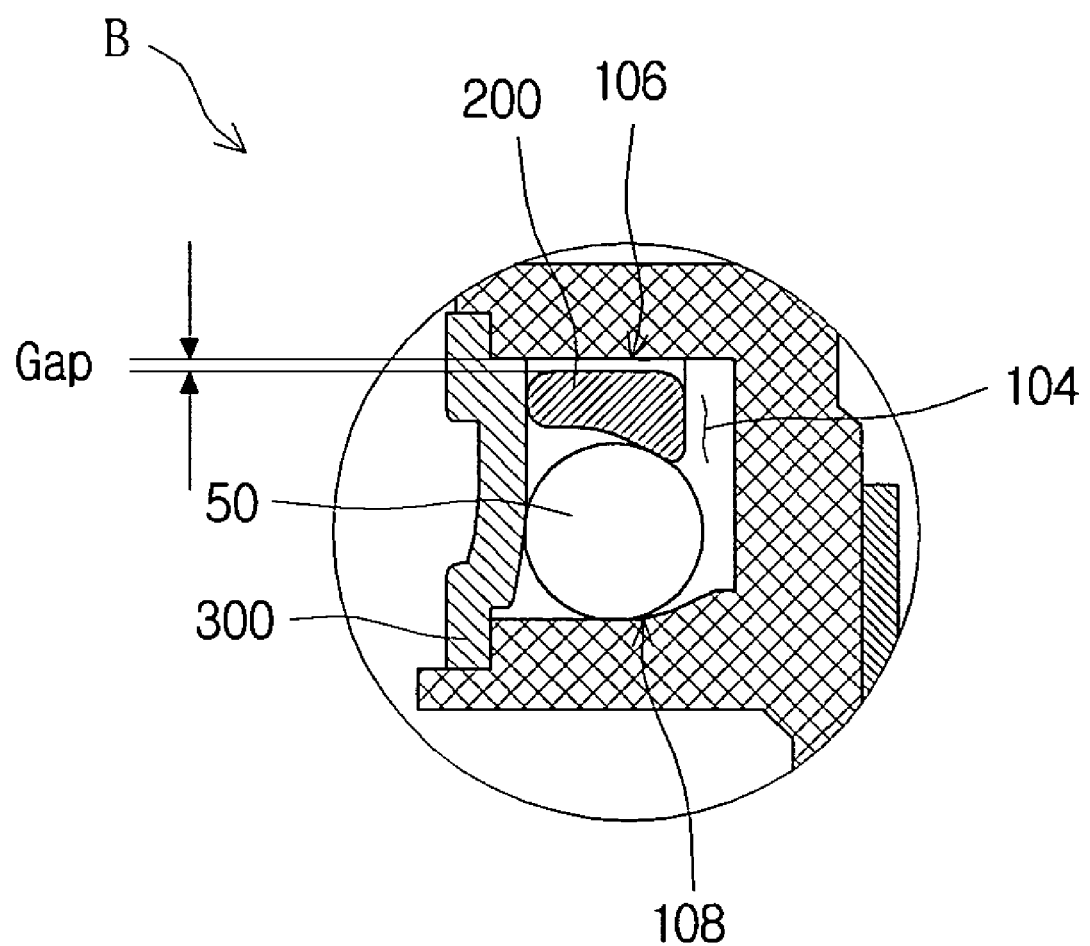
FIG. 10 is a partial cross-sectional view of portion B in FIG. 8.
Figure 11:
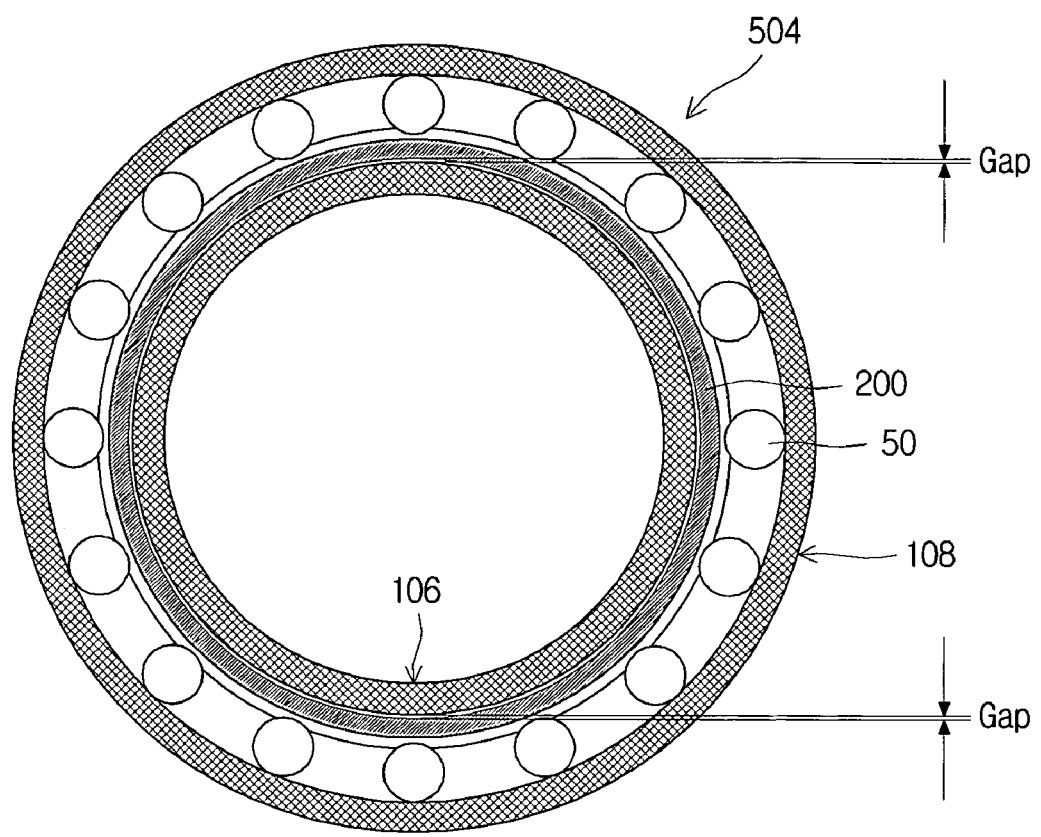
FIG. 11 is a bottom view illustrating a disc driving device according to a second disclosed embodiment of the invention, in a balanced state.

FIG. 8 is a cross-sectional view illustrating a disc driving device 1000 according to the second disclosed embodiment of the invention in a balanced state, FIG. 9 is a partial cross-sectional view of portion A in FIG. 8, and FIG. 10 is a partial cross-sectional view of portion B in FIG. 8. FIG. 11 is a bottom view illustrating a disc driving device 1000 according to the second disclosed embodiment of the invention in a balanced state.

In FIG. 8, a disc driving device 1000 according to this embodiment is shown which is positioned such that the rotating shaft 602 is perpendicular to the direction of gravity. In this position, if the disc driving device 1000 is in a balanced state, the upper side of the outer perimeter of the correcting ring 200 may be in contact with the correcting balls 50. As described above, due to the curved outward inwall 108 of the insertion groove 104 and the outwardly inclined sliding disc 300, the correcting balls 50 may be rotated while positioned in outward lower directions of the insertion groove 104.

In addition, as shown in FIGS. 9 and 10, the correcting ring 200 in a balanced state may be positioned adjacent to the sliding disc 300, with the upper end of the outer perimeter of the correcting ring 200 touching the correcting balls 50, thereby assisting in having the correcting balls 50 positioned at the outward lower directions of the insertion groove 104. As the positions of the correcting balls 50 are stabilized, problems of noise and vibration caused by the correcting balls 50 can be reduced.

As shown in FIG. 11, in a balanced state, the correcting balls 50 of the disc driving device 1000 may be distributed evenly throughout the entire insertion groove 104. The correcting ring 200, in a balanced state, may be separated from the inward inwall 106 of the insertion groove 104 by substantially the same gap at the top and bottom. As the inner perimeter of the correcting ring 200 may not be in contact with the inward inwall 106 of the insertion groove 104, there may be no friction occurring between the correcting ring 200 and the inward inwall 106 of the insertion groove 104.

Figure 12:
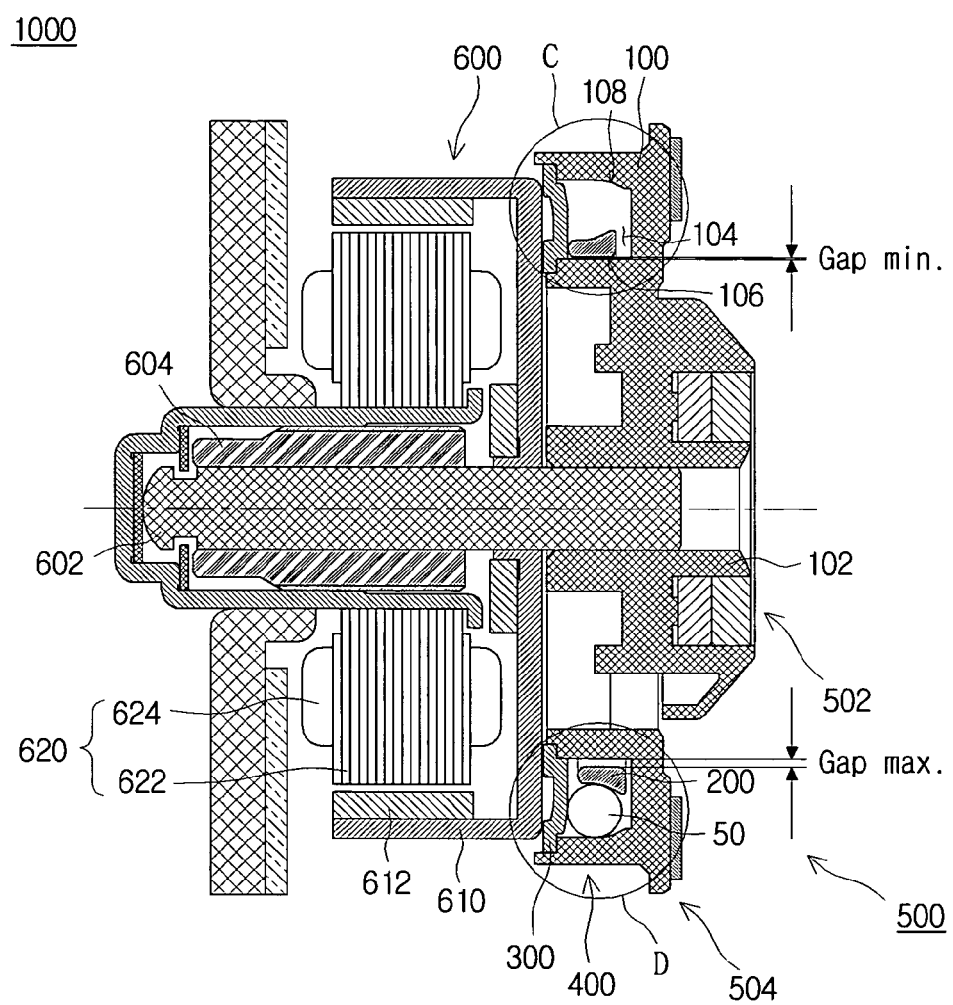
FIG. 12 is a cross-sectional view illustrating a disc driving device according to a second disclosed embodiment of the invention, in an unbalanced state.
Figure 13:
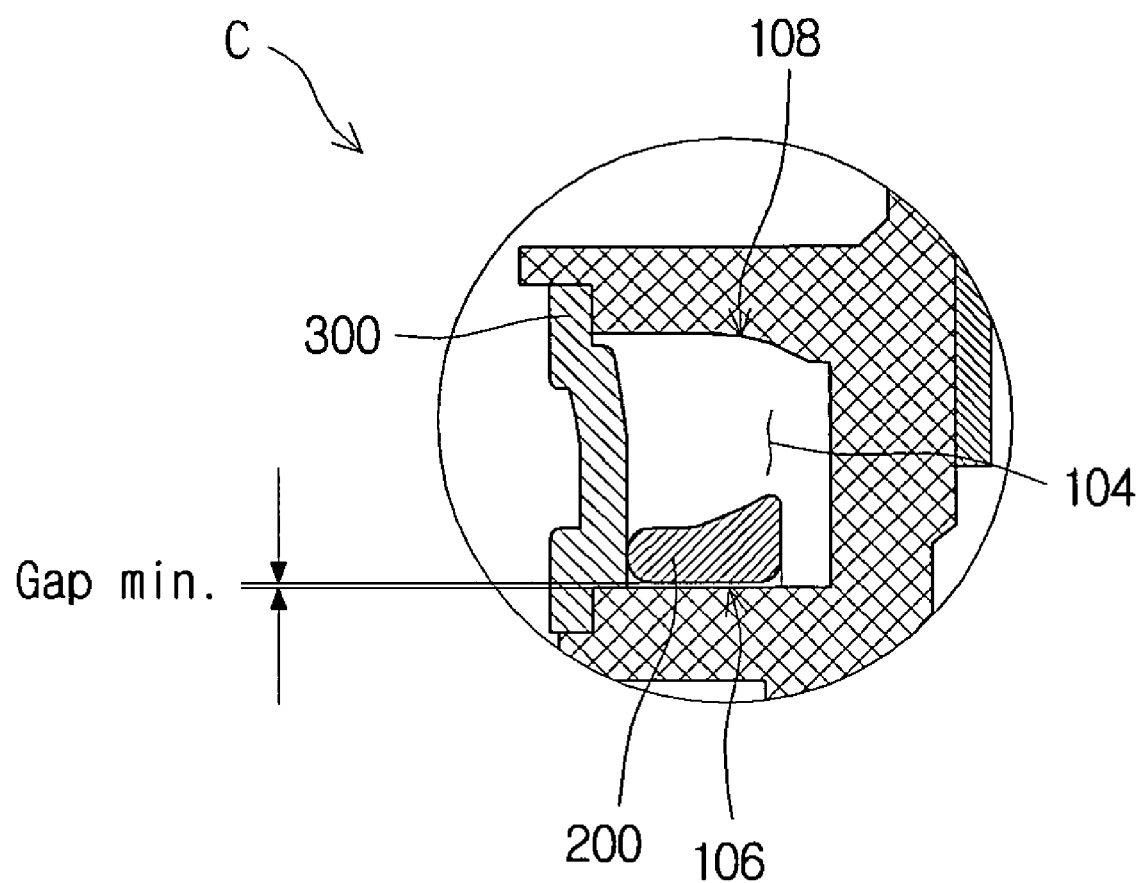
FIG. 13 is a partial cross-sectional view of portion C in FIG. 12.
Figure 14:
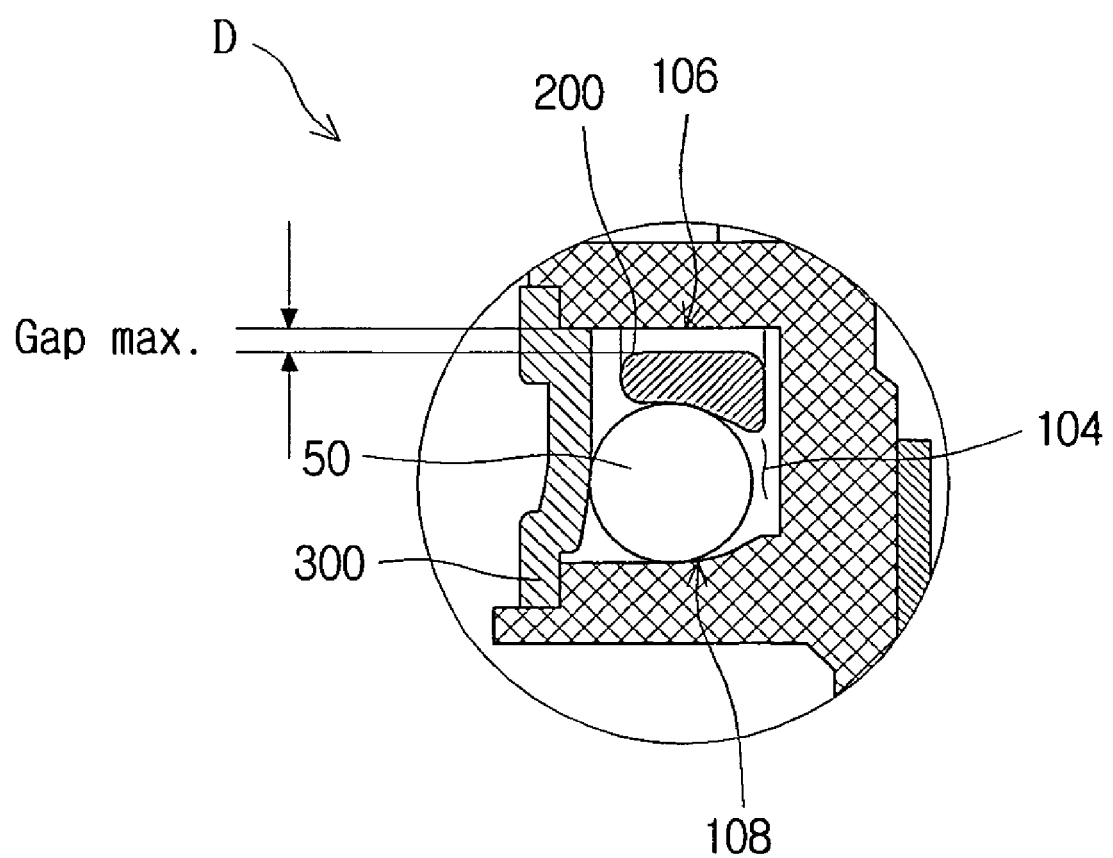
FIG. 14 is a partial cross-sectional view of portion D in FIG. 12.
Figure 15:
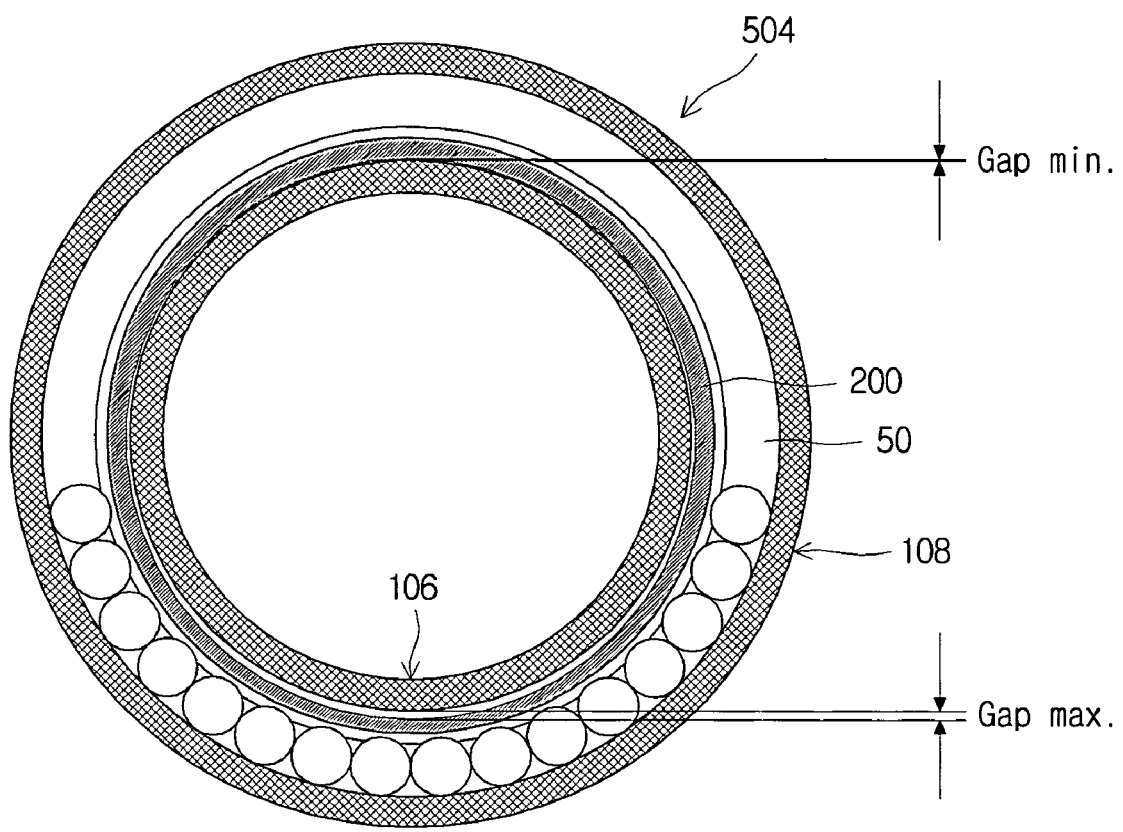
FIG. 15 is a bottom view illustrating a disc driving device according to a second disclosed embodiment of the invention, in an unbalanced state.

FIG. 12 is a cross-sectional view illustrating a disc driving device 1000 according to the second disclosed embodiment of the invention in an unbalanced state, FIG. 13 is a partial cross-sectional view of portion C in FIG. 12, and FIG. 14 is a partial cross-sectional view of portion D in FIG. 12. FIG. 15 is a bottom view illustrating a disc driving device 1000 according to the second disclosed embodiment of the invention in an unbalanced state.

As shown in FIG. 12, when the disc driving device 1000 is in an unbalanced state, the correcting balls 50 may be concentrated at one side of the insertion groove 104. Here, the correcting ring 200 may move away to be separated from the sliding disc 300, all the while having the inclined outer perimeter of the correcting ring 200 maintain contact with the correcting balls 50. Therefore, even in an unbalanced state, the correcting balls 50 may receive centrifugal forces in particular directions, and may remain in particular positions, so that the occurrence of noise, etc., may be reduced.

As shown in FIG. 15, in an unbalanced state, the correcting balls 50 may be distributed at one side of the insertion groove 104. Even in this case, the inner perimeter of the correcting ring 200 may still be separated from the inward inwall 106 of the insertion groove 104, as illustrated in FIG. 13.

As shown in FIG. 14, the correcting balls 50 at one side of the insertion groove 104 may be in contact with the correcting ring 200, the friction between which may quickly raise the correcting balls 50. Consequently, the disc driving device 1000 may quickly distribute the correcting balls 50 evenly inside the insertion groove 104, and may thus enter a balanced state.

Figure 16:
FIG. 16 is a cross-sectional view illustrating a correcting ring according to a third disclosed embodiment of the invention.
Figure 17:
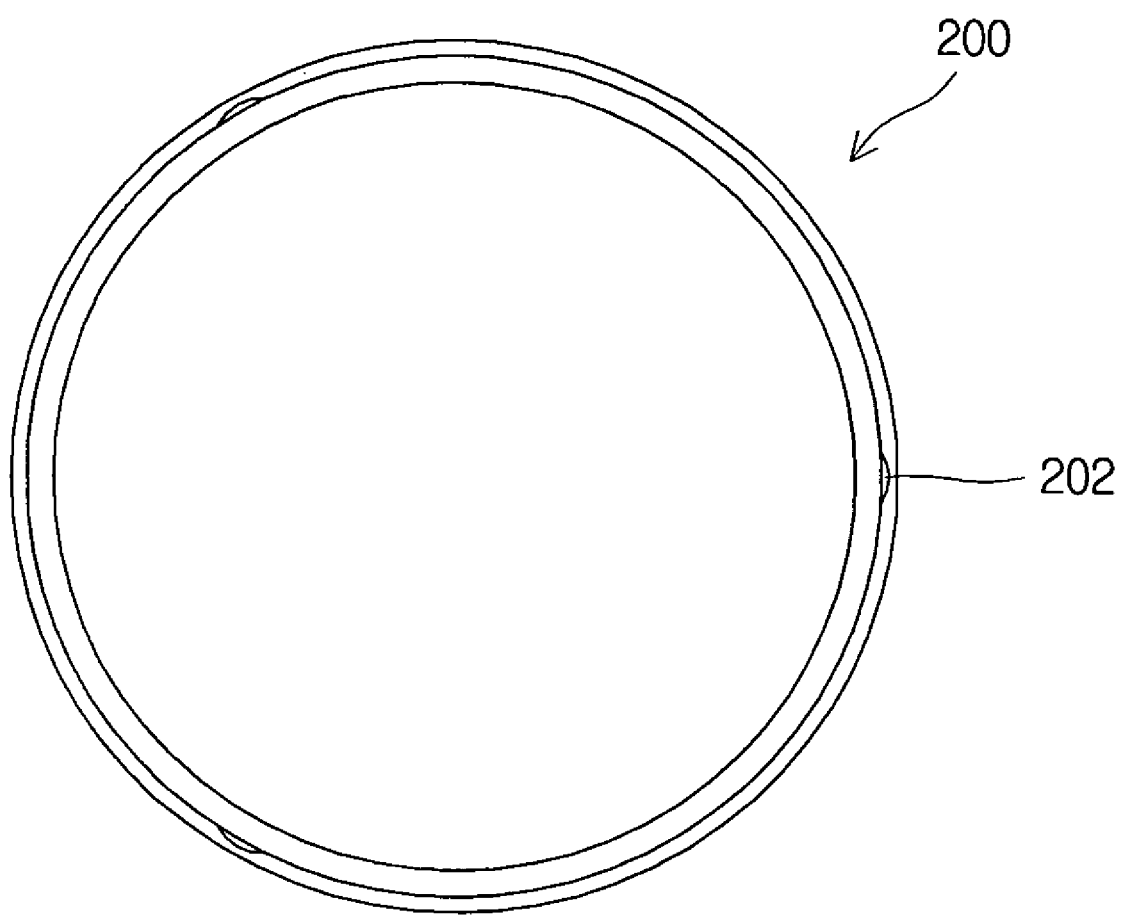
FIG. 17 is a bottom view illustrating a correcting ring according to a third disclosed embodiment of the invention.

FIG. 16 is a cross-sectional view illustrating a correcting ring 200 according to a third disclosed embodiment of the invention, and FIG. 17 is a bottom view illustrating a correcting ring 200 according to the third disclosed embodiment of the invention. In the outer perimeter of a correcting ring 200 according to this embodiment, first protrusions 202 may be formed, which induce a movement of the correcting balls. The first protrusions 202 may be formed protruding from the inclined portion of the outer perimeter of the correcting ring 200, where multiple first protrusions 202 can be formed in particular intervals. The number of first protrusions 202 can be adjusted as necessary. The first protrusions 202 may induce movement for correcting balls 50 that are concentrated in a particular area while in an unbalanced state, to allow the correcting balls 50 to quickly achieve even distribution.

Figure 18:
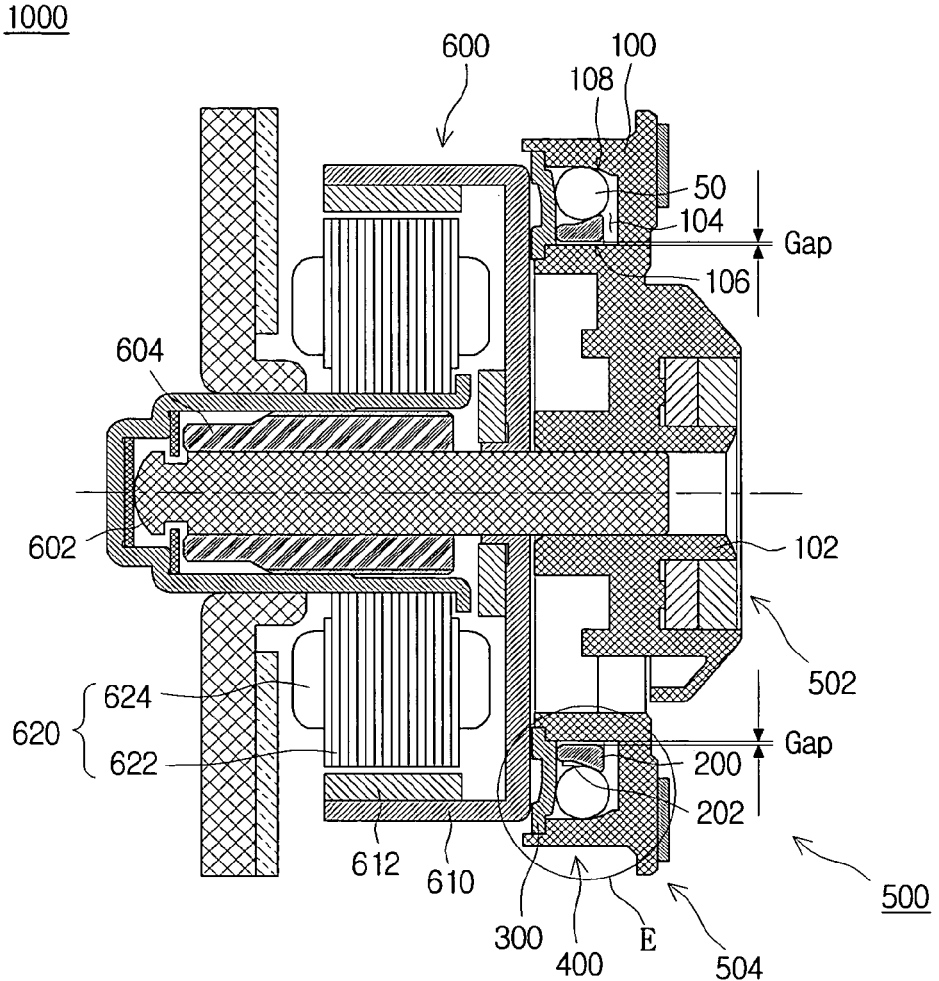
FIG. 18 is a cross-sectional view illustrating a disc driving device according to a third disclosed embodiment of the invention, in a balanced state.
Figure 19:
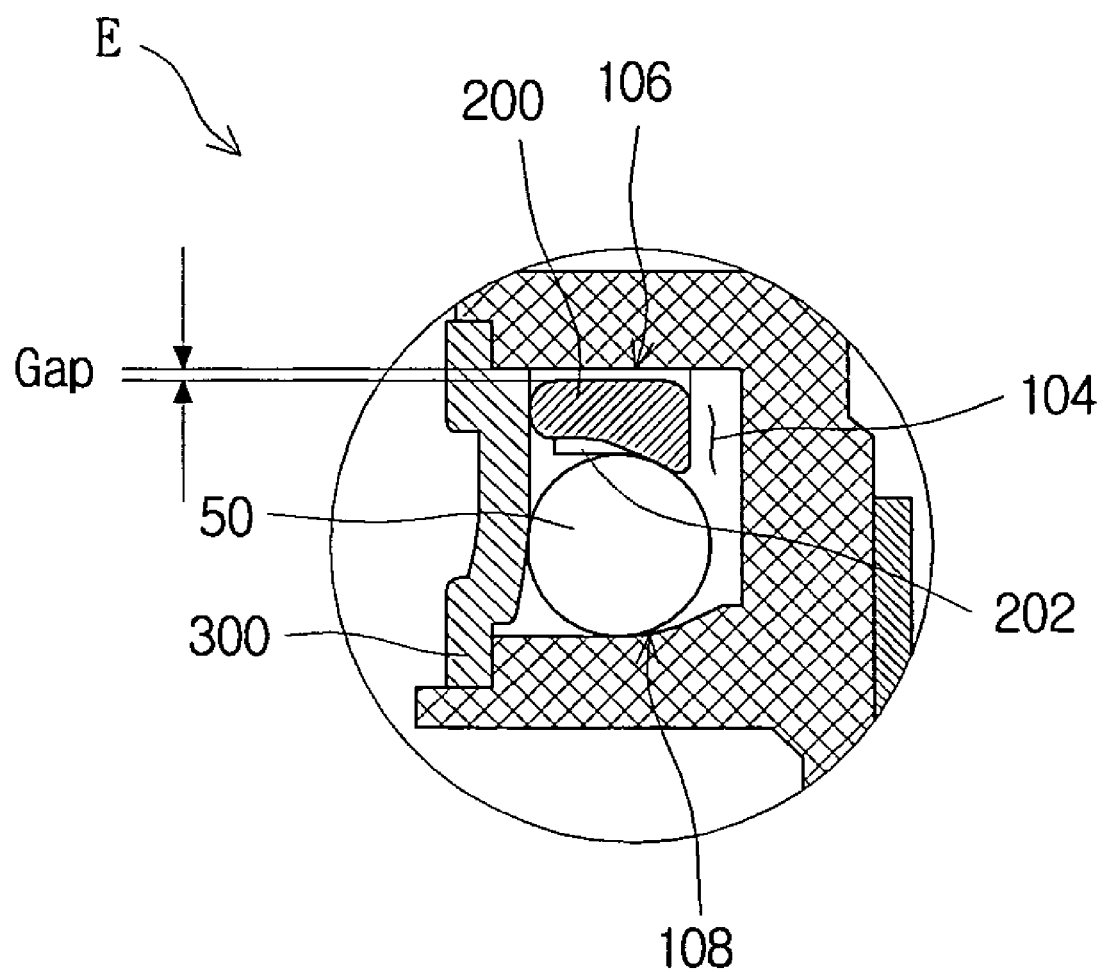
FIG. 19 is a partial cross-sectional view of portion E in FIG. 18.
Figure 20:
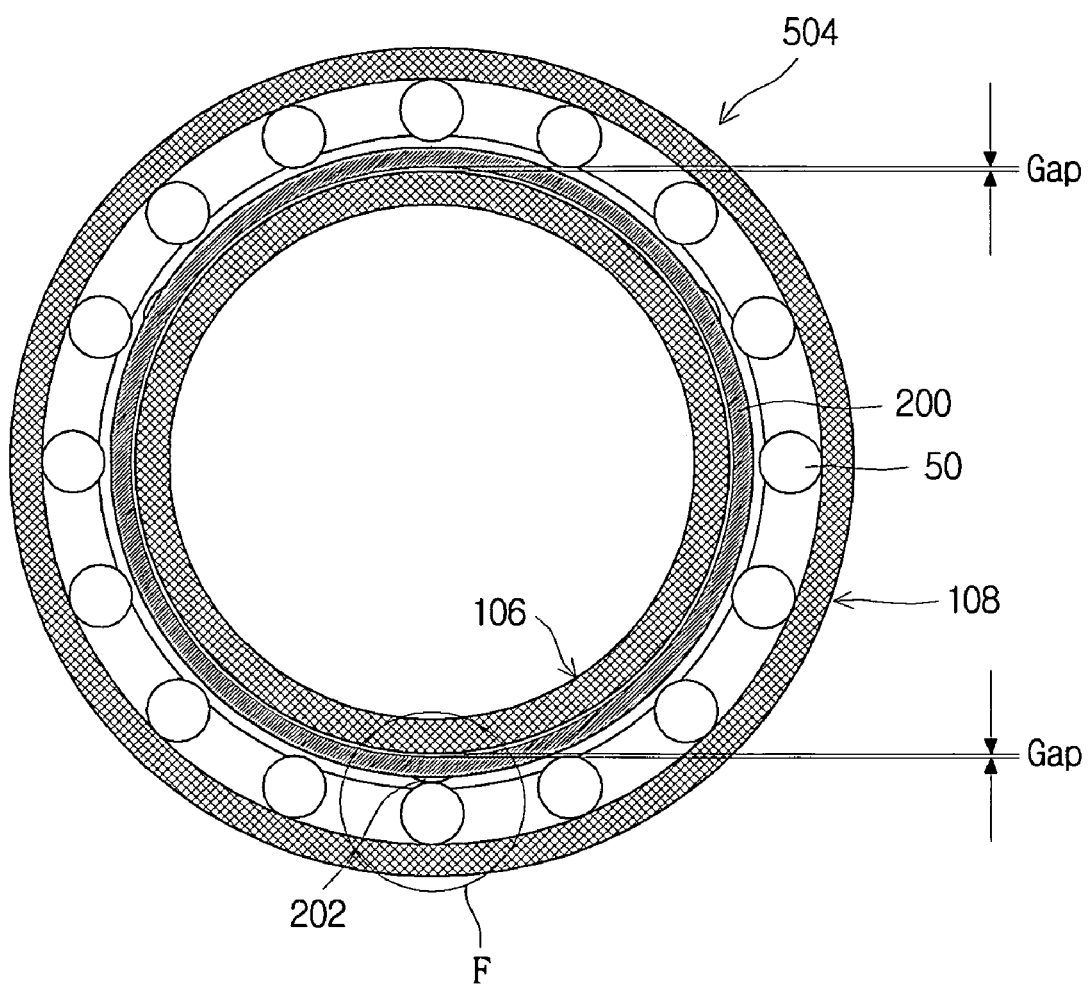
FIG. 20 is a bottom view illustrating a disc driving device according to a third disclosed embodiment of the invention, in a balanced state.
Figure 21:
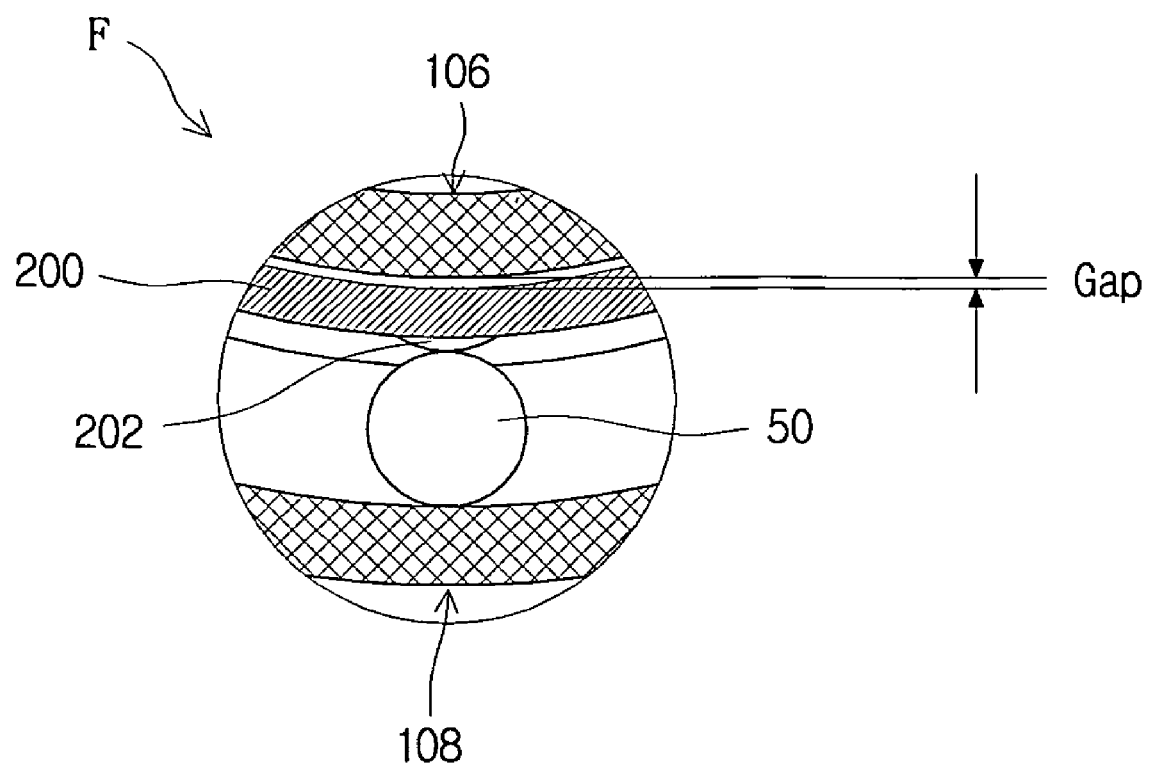
FIG. 21 is a partial bottom view of portion F in FIG. 20.

FIG. 18 is a cross-sectional view illustrating a disc driving device 1000 according to the third disclosed embodiment of the invention in a balanced state, FIG. 19 is a partial cross-sectional view of portion E in FIG. 18, and FIG. 20 is a bottom view illustrating a disc driving device 1000 according to the third disclosed embodiment of the invention in a balanced state. FIG. 21 is a partial bottom view of portion F in FIG. 20.

As shown in FIGS. 18 and 20, in a balanced state, the correcting balls 50 may be distributed evenly inside the insertion groove 104. As shown in FIGS. 19 and 21, in a balanced state, the correcting balls 50 may be in contact with the inclined portion of the outer perimeter of the correcting ring 200 and the first protrusions 202. The correcting balls 50 may be positioned at the side adjoining the sliding disc 300. Also, the correcting balls 50 may rotate along a path concentric to the disc driving device 1000.

Figure 22:
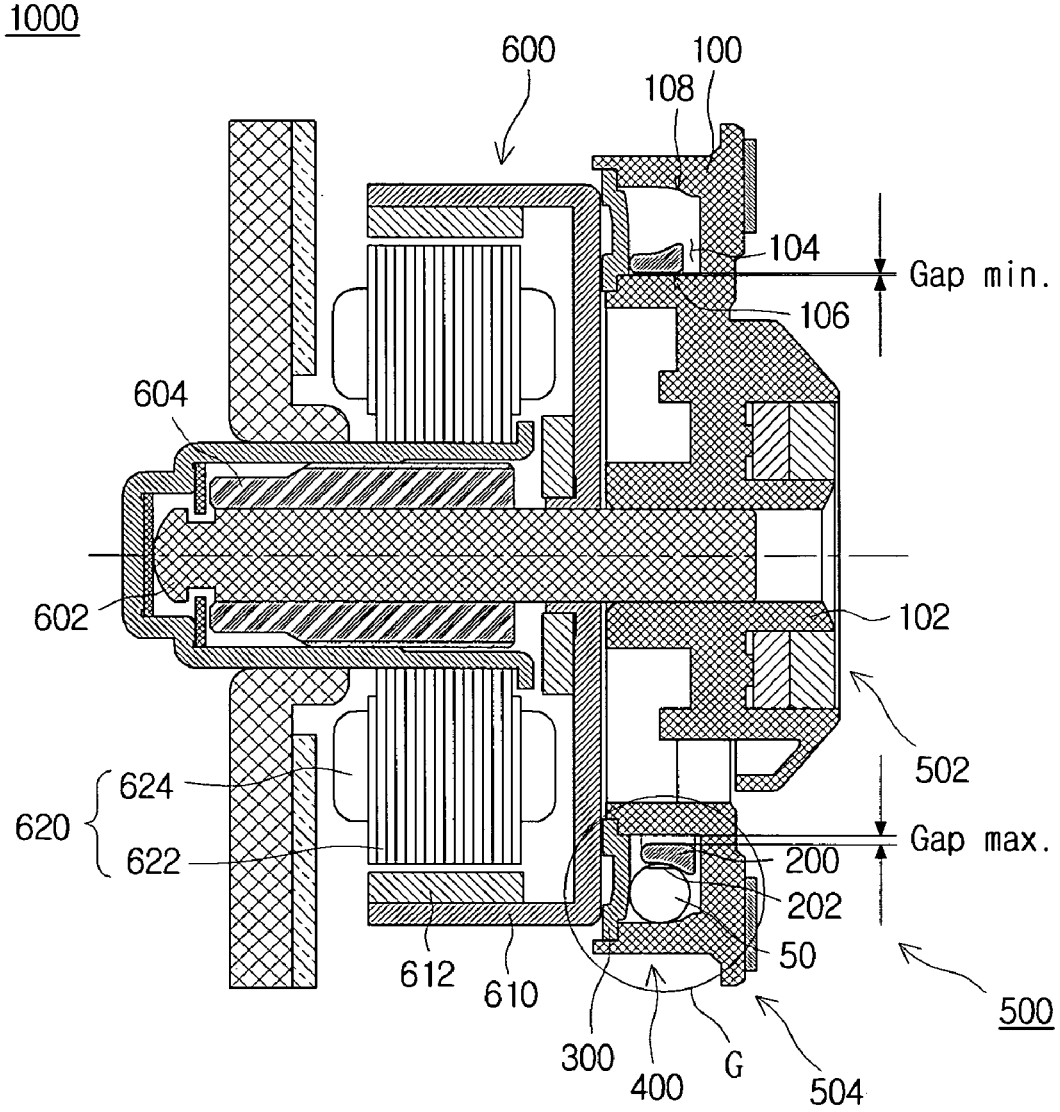
FIG. 22 is a cross-sectional view illustrating a disc driving device according to a third disclosed embodiment of the invention, in an unbalanced state.
Figure 23:
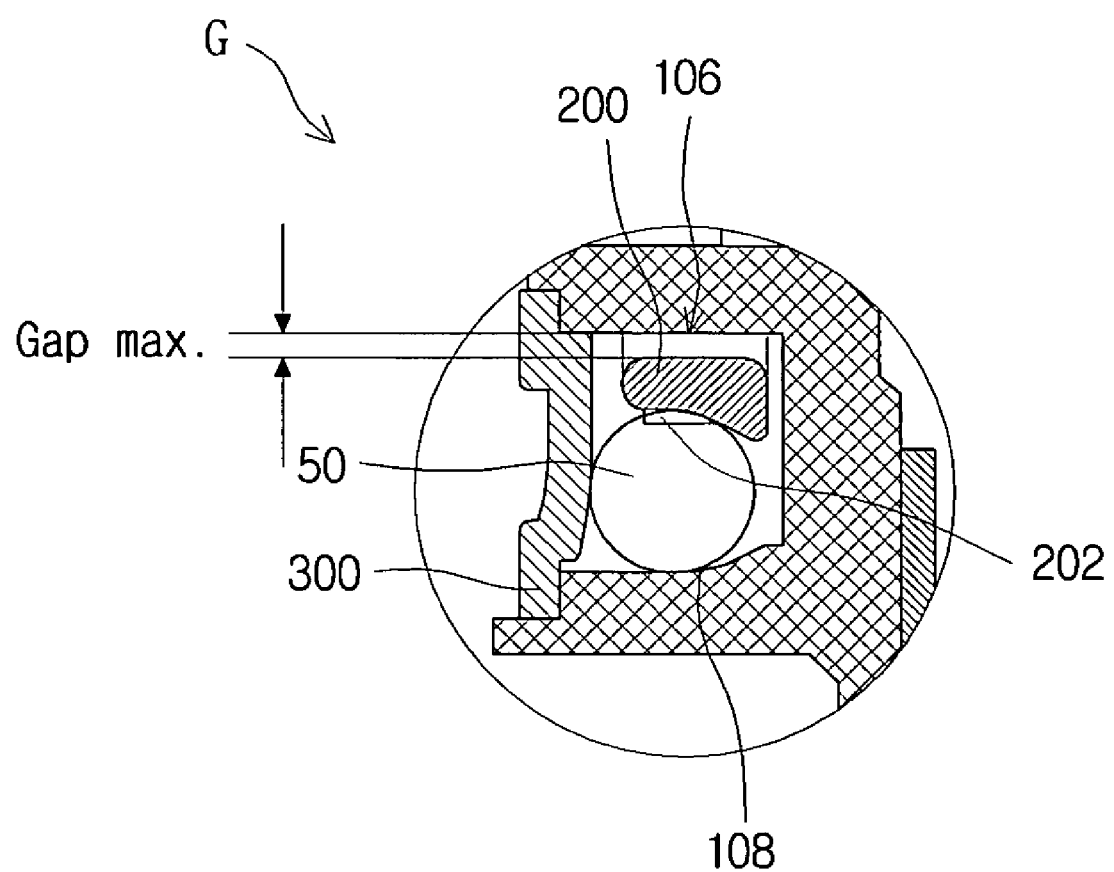
FIG. 23 is a partial cross-sectional view of portion G in FIG. 22.
Figure 24:
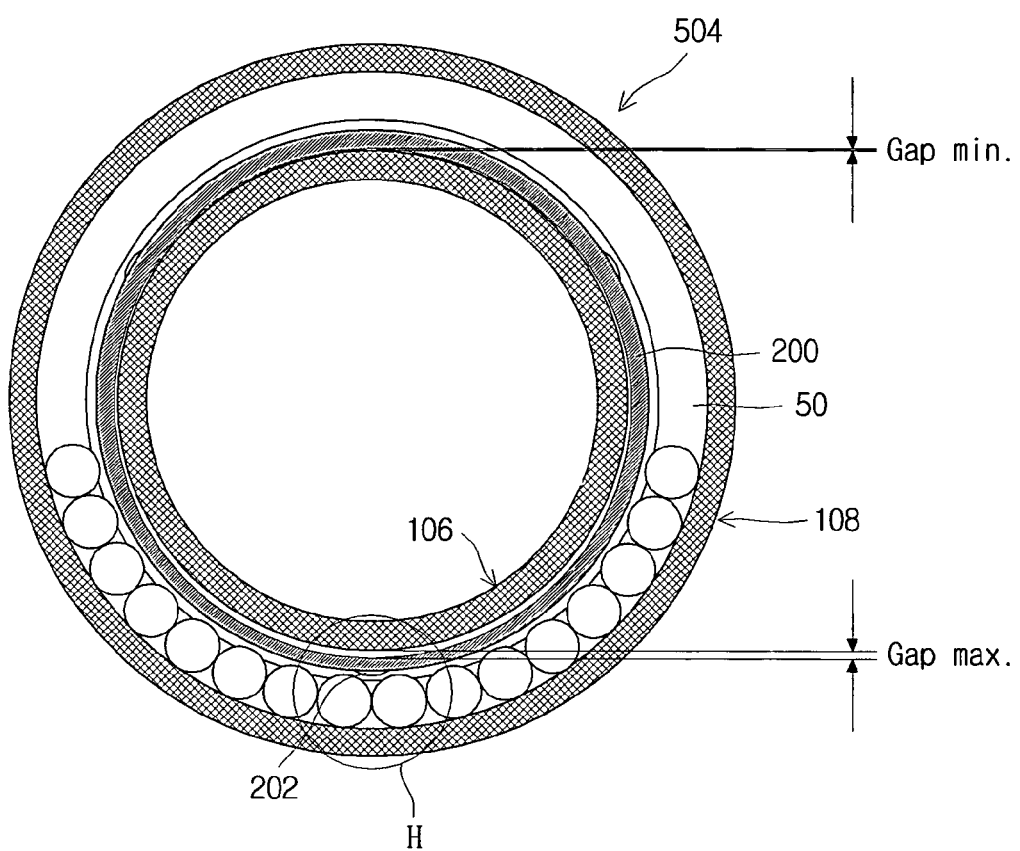
FIG. 24 is a bottom view illustrating a disc driving device according to a third disclosed embodiment of the invention, in an unbalanced state.
Figure 25:
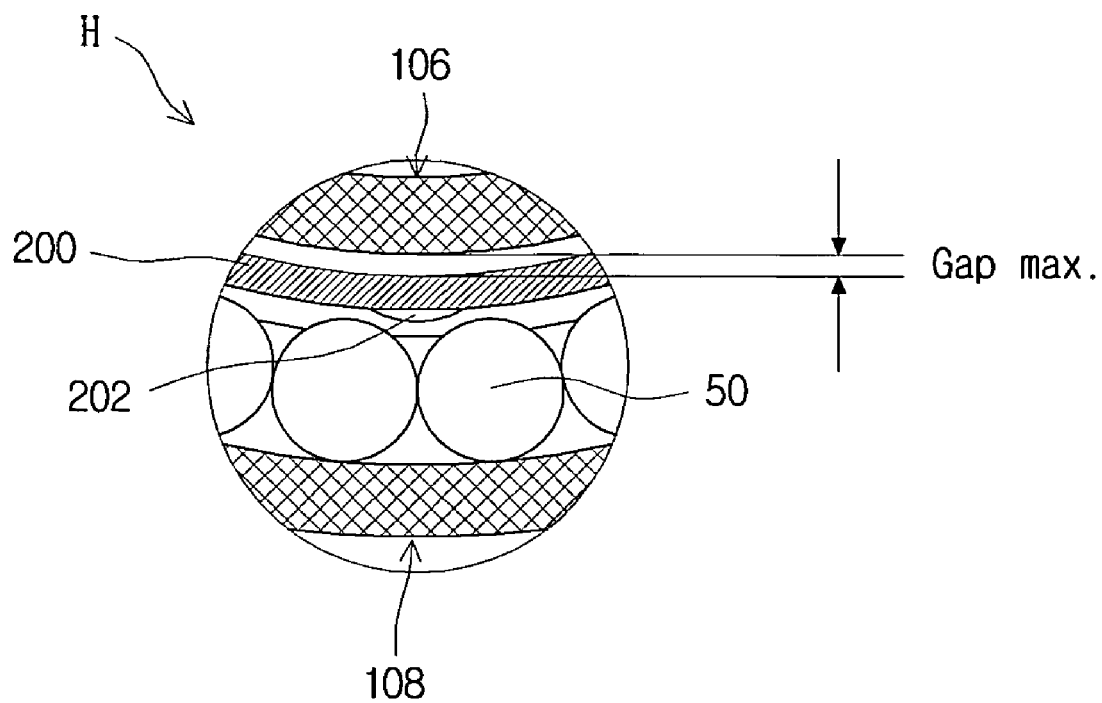
FIG. 25 is a partial bottom view of portion H in FIG. 24.

FIG. 22 is a cross-sectional view illustrating a disc driving device 1000 according to the third disclosed embodiment of the invention in an unbalanced state, FIG. 23 is a partial cross-sectional view of portion G in FIG. 22, and FIG. 24 is a bottom view illustrating a disc driving device 1000 according to the third disclosed embodiment of the invention in an unbalanced state. FIG. 25 is a partial bottom view of portion H in FIG. 24.

As shown in FIGS. 22 and 24, in an unbalanced state, the correcting balls 50 may be concentrated at one side of the insertion groove 104. Here, the correcting ring 200 may move away to be separated from the sliding disc 300, while maintaining contact with the correcting balls 50. Also, as shown in FIGS. 23 and 25, the center of rotation of the correcting ring 200 may be misaligned with that of the disc driving device 1000, and may thus shift to one side.

Thus, a first protrusions 202 may be positioned between correcting balls 50, and as the first protrusion 202 catches onto a correcting ball 50, friction may be created between the first protrusion 202 and the correcting ball 50 that induces movement in the correcting ball 50. Therefore, the correcting balls 50 concentrated in a particular area may quickly be positioned to an even distribution, whereby the disc driving device 1000 may quickly enter a balanced state.

Figure 26:
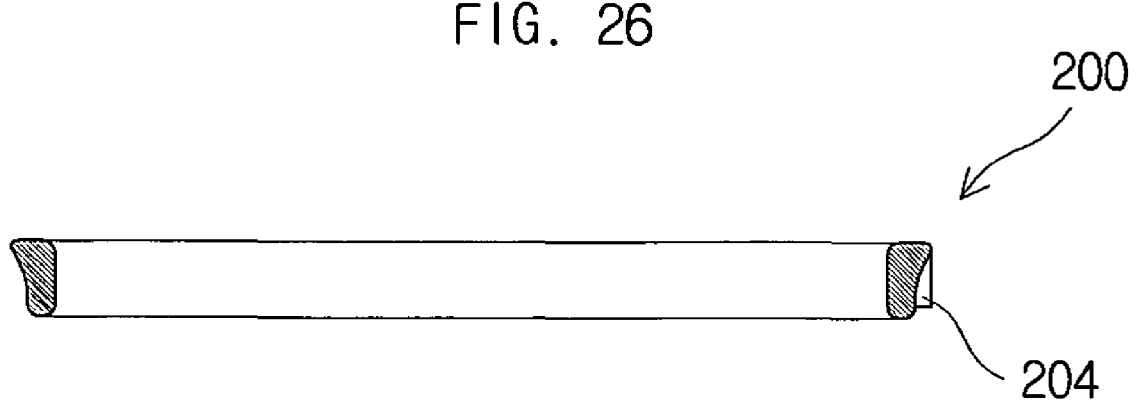
FIG. 26 is a cross-sectional view illustrating a correcting ring according to a fourth disclosed embodiment of the invention.
Figure 27:
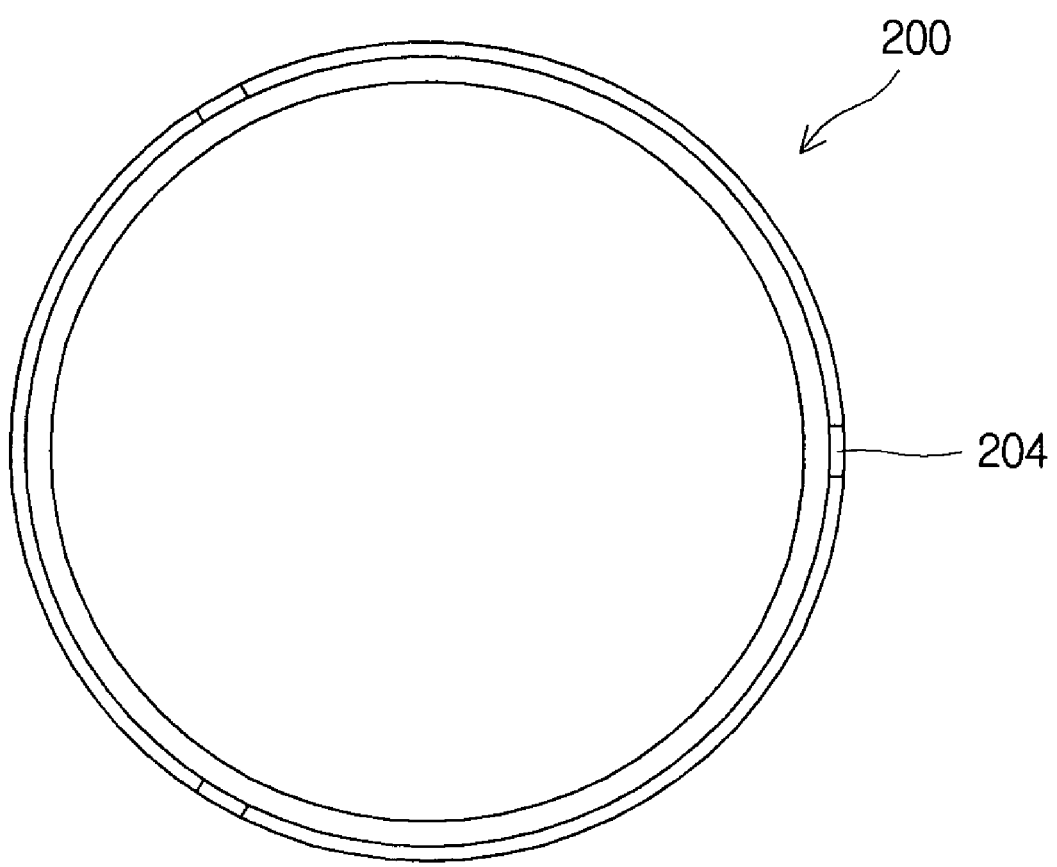
FIG. 27 is a bottom view illustrating a correcting ring according to a fourth disclosed embodiment of the invention.

FIG. 26 is a cross-sectional view illustrating a correcting ring 200 according to a fourth disclosed embodiment of the invention, and FIG. 27 is a bottom view illustrating a correcting ring 200 according to the fourth disclosed embodiment of the invention. Second protrusions 204, according to this embodiment, may be formed in particular intervals along the perimeter of the correcting ring 200, such that the insertion groove 104 may be segmented. As shown in FIGS. 26 and 27, the second protrusions 204 can be formed to a height equal to that of the outermost end of the perimeter of the correcting ring 200.

Figure 28:
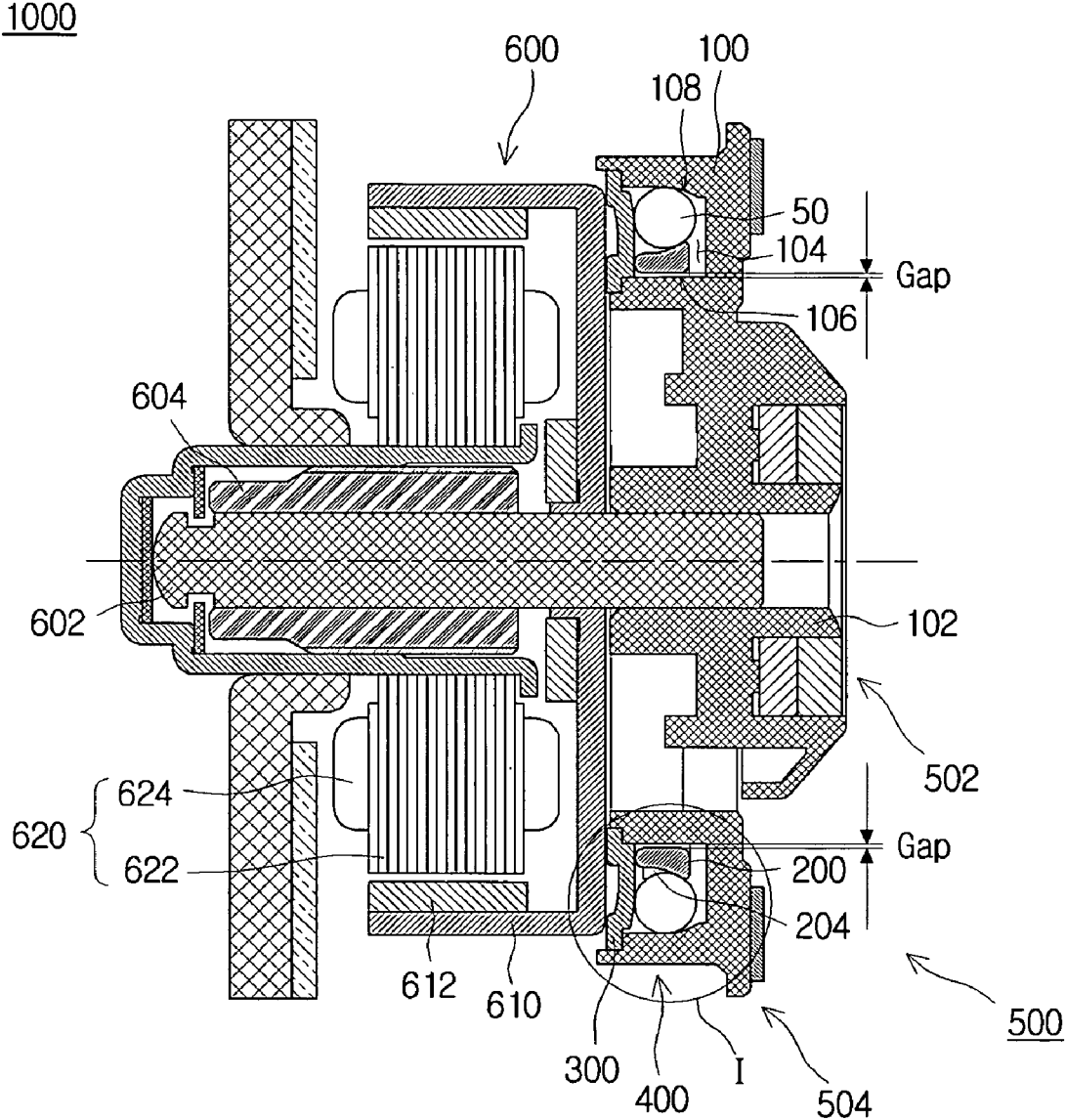
FIG. 28 is a cross-sectional view illustrating a disc driving device according to a fourth disclosed embodiment of the invention, in a balanced state.
Figure 29:
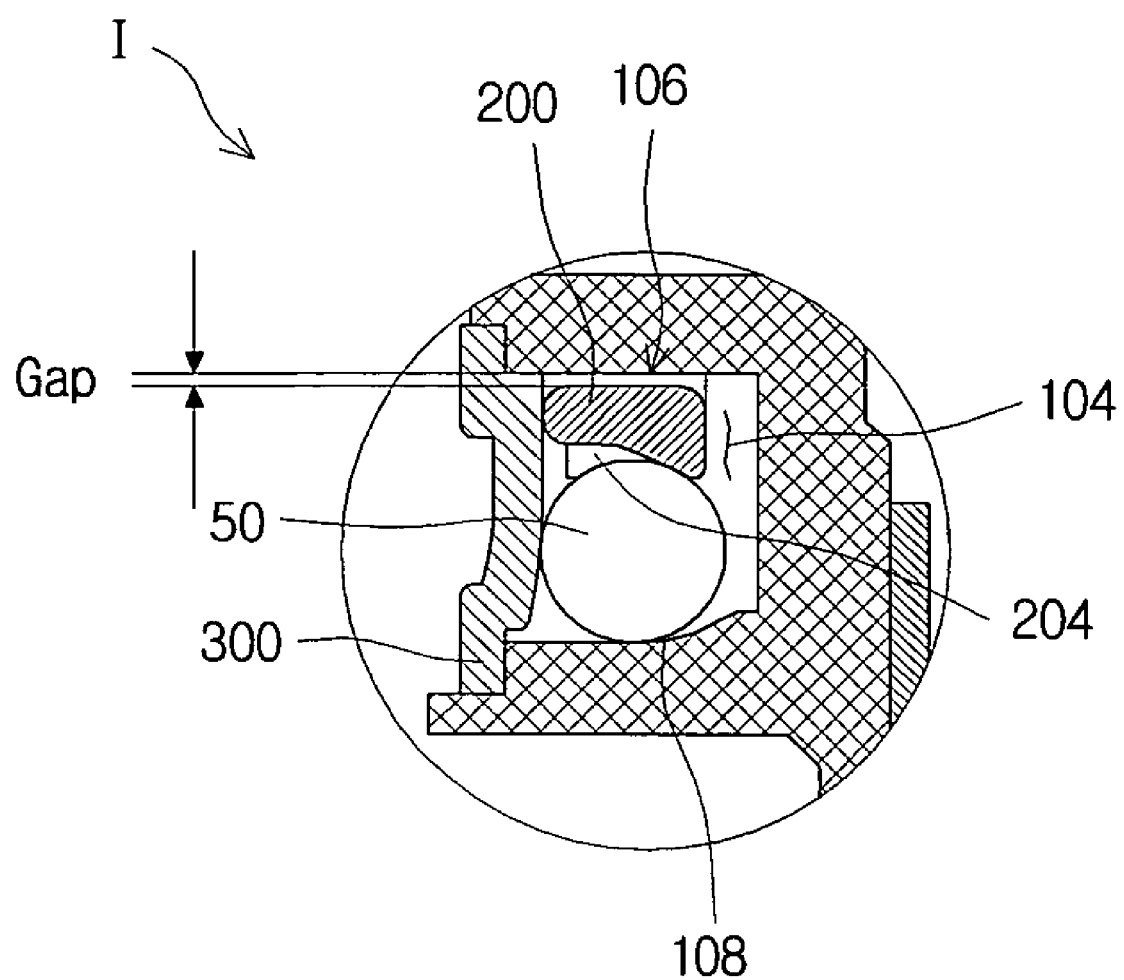
FIG. 29 is a partial cross-sectional view of portion I in FIG. 28.
Figure 30:
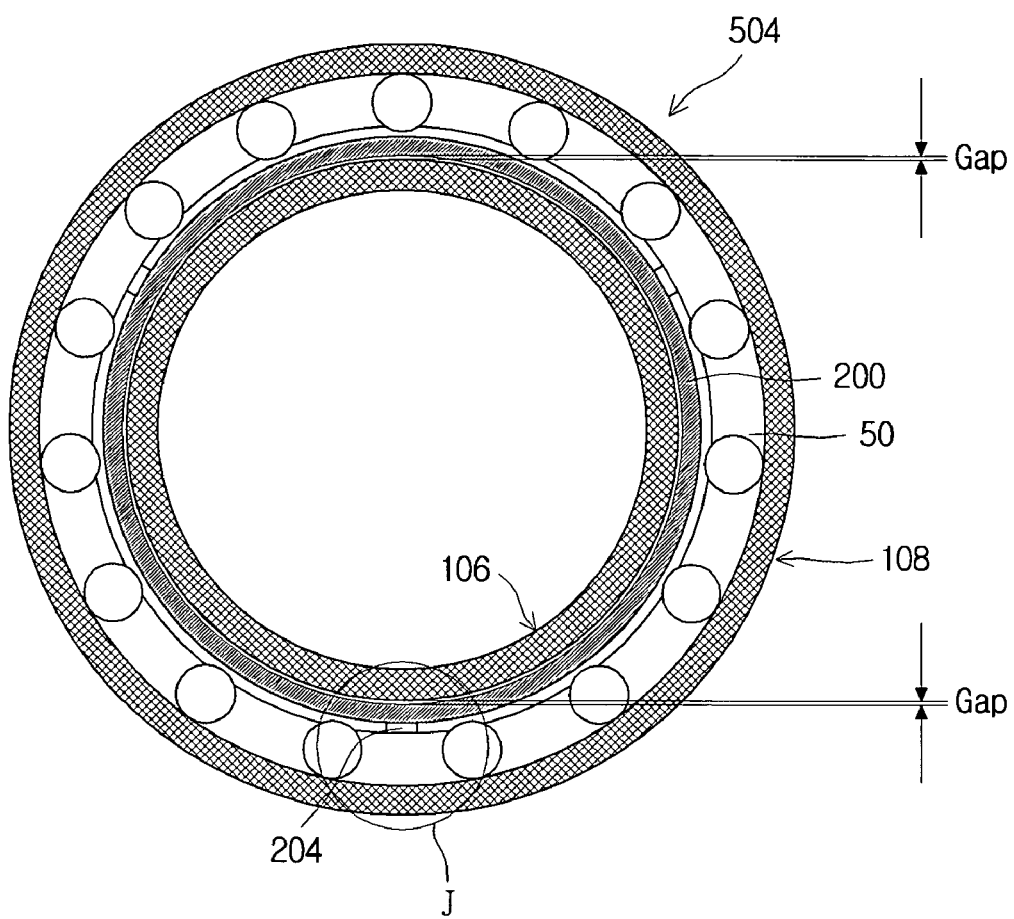
FIG. 30 is a bottom view illustrating a disc driving device according to a fourth disclosed embodiment of the invention, in a balanced state.
Figure 31:
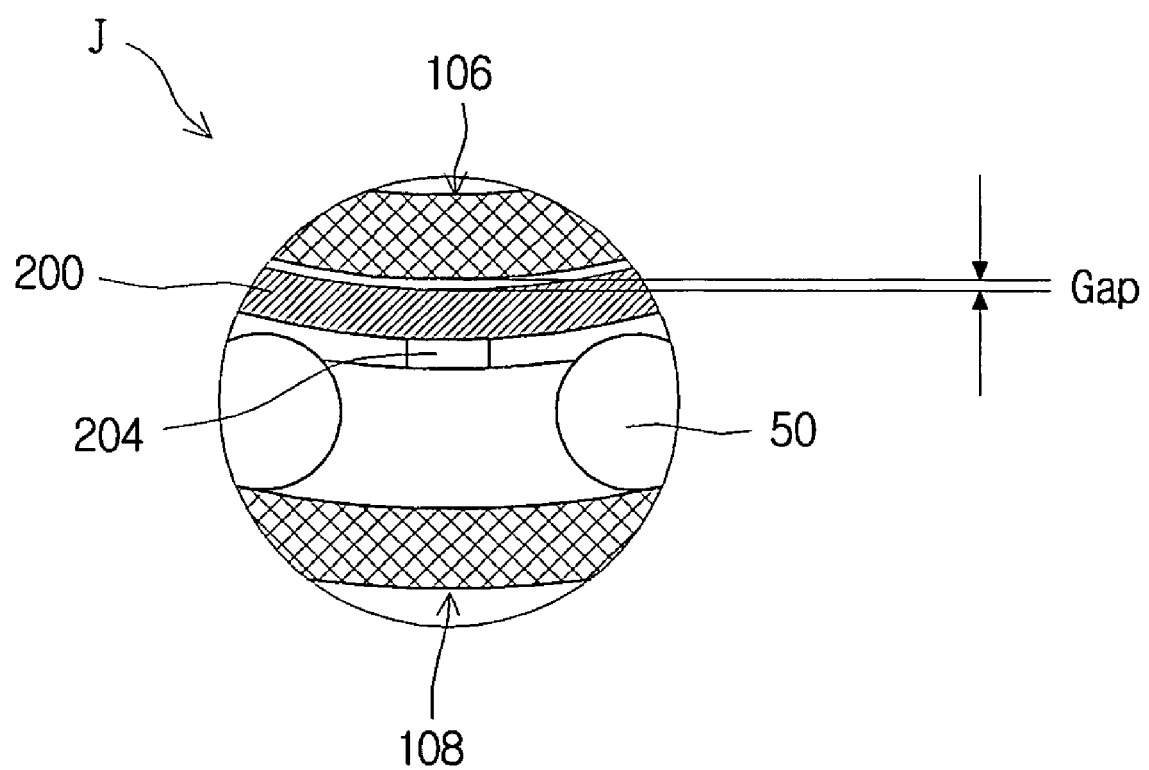
FIG. 31 is a partial bottom view of portion J in FIG. 30.

FIG. 28 is a cross-sectional view illustrating a disc driving device 1000 according to the fourth disclosed embodiment of the invention in a balanced state, FIG. 29 is a partial cross-sectional view of portion I in FIG. 28, and FIG. 30 is a bottom view illustrating a disc driving device 1000 according to the fourth disclosed embodiment of the invention in a balanced state. FIG. 31 is a partial bottom view of portion J in FIG. 30.

As shown in FIGS. 28 and 30, in a balanced state, the correcting balls 50 may be distributed evenly inside the insertion groove 104. The correcting ring 200 may be positioned at the side adjoining the sliding disc 300 while being in contact with the correcting balls 50. As shown in FIGS. 29 and 31, the second protrusions 204 may be present between the correcting balls 50, even in a balanced state, to segment the areas inside the insertion groove 104 in which the correcting balls 50 are positioned. The correcting balls 50 may rotate along a path concentric to the disc driving device 1000 with a particular gap from the inward inwall 106 of the insertion groove 104.

Figure 32:
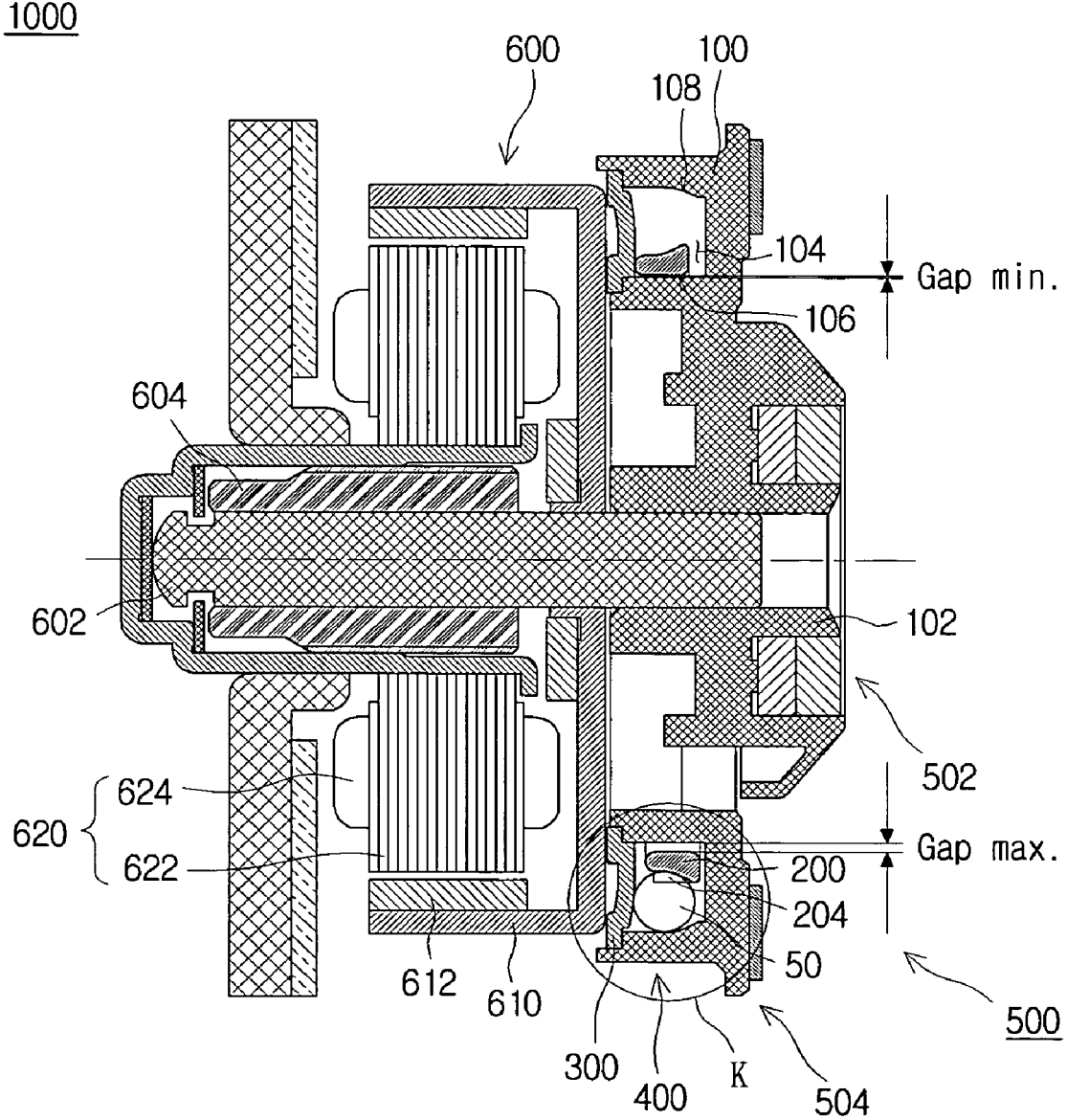
FIG. 32 is a cross-sectional view illustrating a disc driving device according to a fourth disclosed embodiment of the invention, in an unbalanced state.
Figure 33:
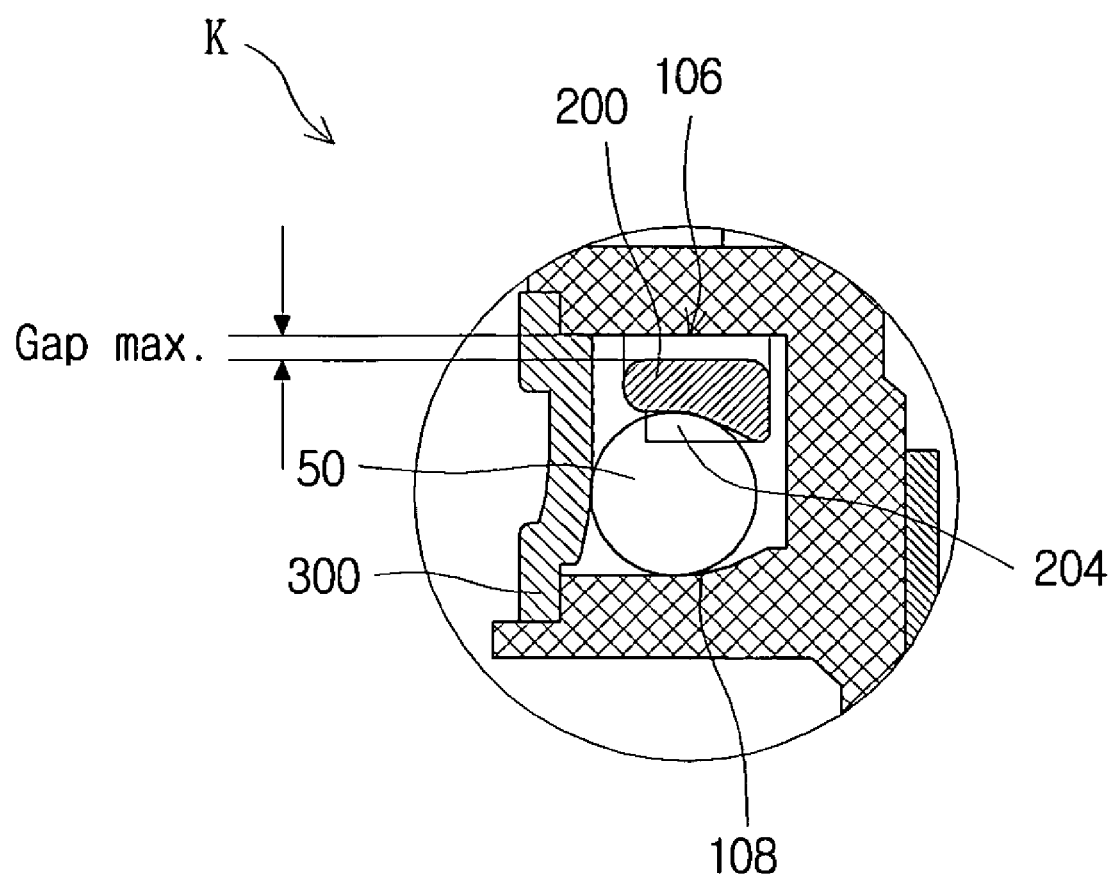
FIG. 33 is a partial cross-sectional view of portion K in FIG. 32.
Figure 34:
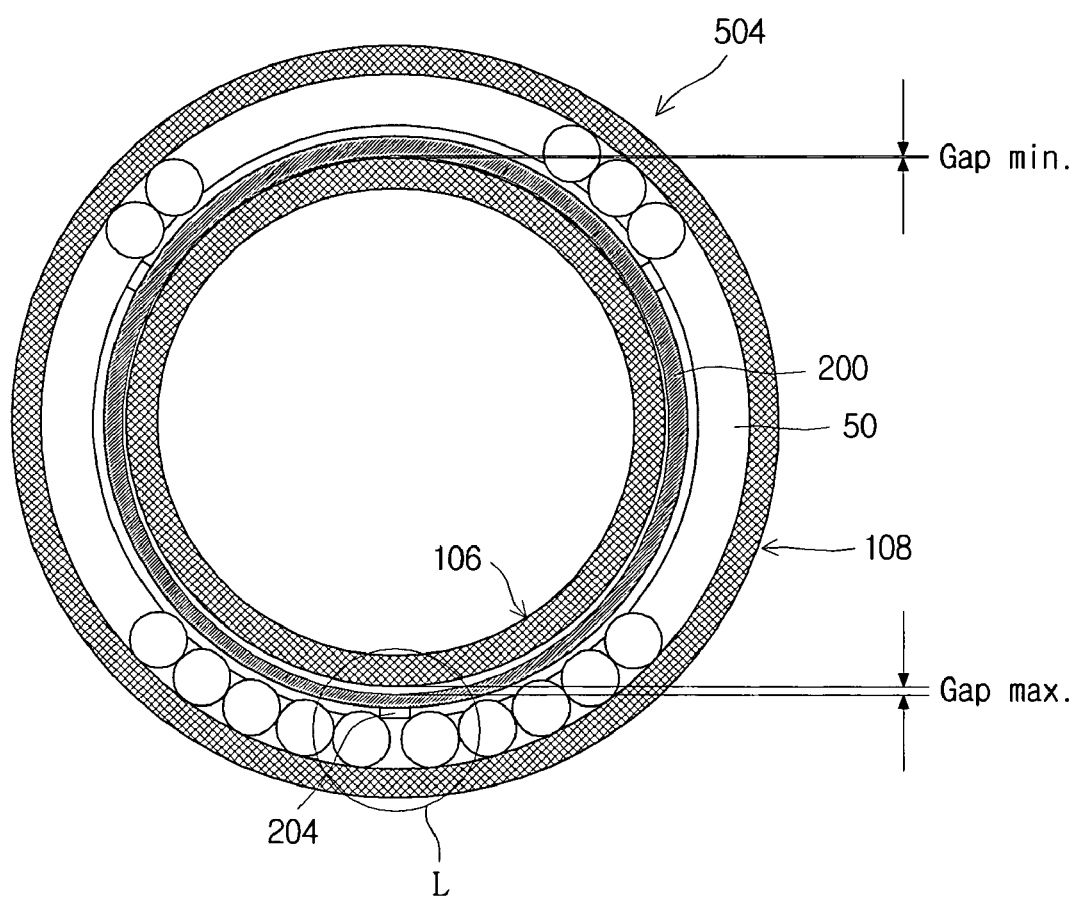
FIG. 34 is a bottom view illustrating a disc driving device according to a fourth disclosed embodiment of the invention, in an unbalanced state.
Figure 35:
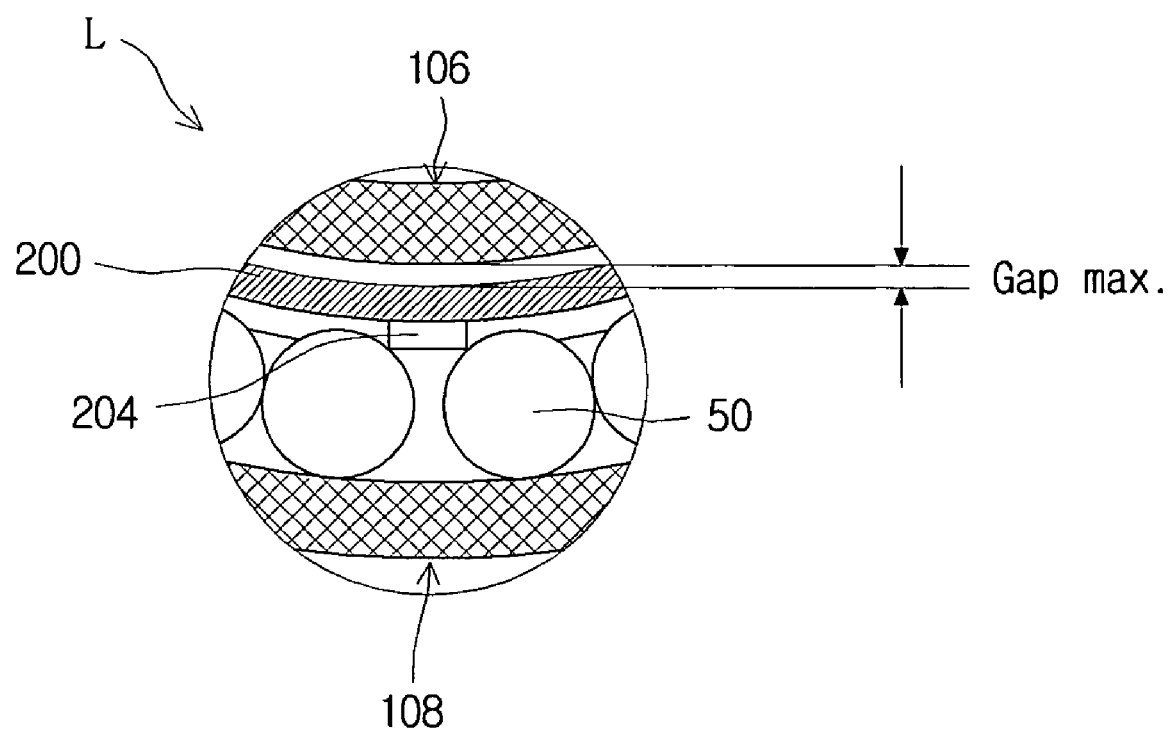
FIG. 35 is a partial bottom view of portion L in FIG. 34.

FIG. 32 is a cross-sectional view illustrating a disc driving device 1000 according to the fourth disclosed embodiment of the invention in an unbalanced state, FIG. 33 is a partial cross-sectional view of portion K in FIG. 32, and FIG. 34 is a bottom view illustrating a disc driving device 1000 according to the fourth disclosed embodiment of the invention in an unbalanced state. FIG. 35 is a partial bottom view of portion L in FIG. 34.

As shown in FIG. 32, in an unbalanced state, the correcting balls 50 may be concentrated at particular areas of the insertion groove 104. The center of rotation of the correcting ring 200 may be misaligned with that of the disc driving device 1000, so that the gaps may be different at either side between the correcting ring 200 and the insertion groove 104.

As shown in FIG. 34, even in an unbalanced state, the correcting balls 50 may be restricted to spaces within the insertion groove 104 segmented by the second protrusions 204. As shown in FIGS. 33 and 35, the second protrusions 204 may further penetrate the space between the correcting balls 50 to increase the gap between the correcting balls 50, allowing the correcting balls 50 to be positioned only within a limited space. As such, even in an unbalanced state, the correcting balls 50 may not be concentrated at any one particular area, and may have a distribution that is scattered to a certain degree, whereby the disc driving device 1000 may quickly enter a balanced state.

Figure 36:
FIG. 36 is a cross-sectional view illustrating a correcting ring according to a fifth disclosed embodiment of the invention.
Figure 37:
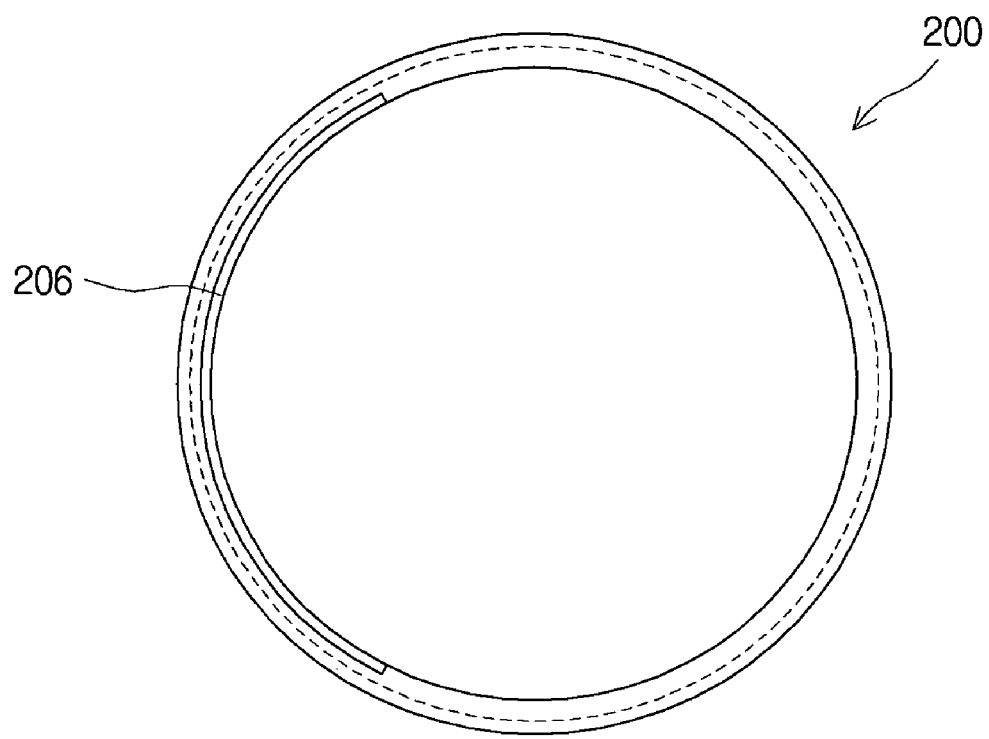
FIG. 37 is a top view illustrating a correcting ring according to a fifth disclosed embodiment of the invention.

FIG. 36 is a cross-sectional view illustrating a correcting ring 200 according to a fifth disclosed embodiment of the invention, and FIG. 37 is a top view illustrating a correcting ring 200 according to the fifth disclosed embodiment of the invention. The correcting ring 200 according to this embodiment may have a recessed portion 206 formed in the inner perimeter.

As shown in FIGS. 36 and 37, the recessed portion 206 may be formed in the inner perimeter of the correcting ring 200, to reduce the mass at one side of the correcting ring 200 and provide a generally eccentric correcting ring 200. An eccentric correcting ring 200 may position itself to an appropriate position more quickly when balancing is applied, which can improve the adaptability of the balancing performance.

As set forth above, certain embodiments of the invention can reduce noise and vibration for a rotating body during acceleration and deceleration and during high-speed rotations.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. An auto-balancing device comprising:
a housing coupled with a rotating body and having an annular insertion groove formed therein;
a correcting ring rotatably inserted in the insertion groove; and
a plurality of correcting balls interposed between the correcting ring and an outward inwall of the insertion groove,
wherein an outer perimeter of the correcting ring is in contact with the correcting balls and is inclined towards to an open part of the insertion groove, and an inner perimeter of the correcting ring is separated from an inward inwall of the insertion groove.

2. The auto-balancing device of claim 1, wherein a recessed portion is formed in an inner perimeter of the correcting ring.

3. The auto-balancing device of claim 1, wherein at least one first protrusion is formed on an outer perimeter of the correcting ring, the first protrusion configured to induce a movement of the correcting balls.

4. The auto-balancing device of claim 1, wherein at least one second protrusion is formed on an outer perimeter of the correcting ring in predetermined intervals such that the insertion groove is segmented.

5. The auto-balancing device of claim 1, wherein the outward inwall of the insertion groove is curved such that an open part of the insertion groove expands towards an outer side.

6. The auto-balancing device of claim 1, further comprising a sliding disc covering the insertion groove, the sliding disc supporting the correcting balls such that the correcting balls tilt outwards.

7. A turntable device for detachably securing a disc to a motor, the turntable device comprising:
   a cone part configured to be inserted through an inner perimeter of the disc so as to secure the disc;
   a support part coupled with a rotating shaft of the motor and extending to an outward side of the cone part so as to support the disc;
   an annular insertion groove formed in the support part;
   a correcting ring rotatably inserted in the insertion groove; and
   a plurality of correcting balls interposed between the correcting ring and an outward inwall of the insertion groove,
   wherein an outer perimeter of the correcting ring is in contact with the correcting balls and is inclined towards an open part of the insertion groove, and an inner perimeter of the correcting ring is separated from an inward inwall of the insertion groove.

8. The turntable device of claim 7, wherein a recessed portion is formed in an inner perimeter of the correcting ring.

9. The turntable device of claim 7, wherein at least one first protrusion is formed on an outer perimeter of the correcting ring, the first protrusion configured to induce a movement of the correcting balls.

10. The turntable device of claim 7, wherein at least one second protrusion is formed on an outer perimeter of the correcting ring in predetermined intervals such that the insertion groove is segmented.

11. The turntable device of claim 7, wherein the outward inwall of the insertion groove is curved such that an open part of the insertion groove expands towards an outer side.

12. The turntable device of claim 7, further comprising a sliding disc covering the insertion groove, the sliding disc supporting the correcting balls such that the correcting balls tilt outwards.

13. A disc driving device for driving a disc, the disc driving device comprising:
   a motor configured to generate a driving force;
   a cone part configured to be inserted through an inner perimeter of the disc so as to secure the disc;
   a support part coupled with a rotating shaft of the motor and extending to an outward side of the cone part so as to support the disc;
   an annular insertion groove formed in the support part;
   a correcting ring rotatably inserted in the insertion groove; and
   a plurality of correcting balls interposed between the correcting ring and an outward inwall of the insertion groove,
   wherein the outer perimeter of the correcting ring is in contact with the correcting balls and is inclined towards an open part of the insertion groove, and an inner perimeter of the correcting ring is separated from an inward inwall of the insertion groove.

14. The disc driving device of claim 13, wherein a recessed portion is formed in an inner perimeter of the correcting ring.

15. The disc driving device of claim 13, wherein at least one first protrusion is formed on an outer perimeter of the correcting ring, the first protrusion configured to induce a movement of the correcting balls.

16. The disc driving device of claim 13, wherein at least one second protrusion is formed on an outer perimeter of the correcting ring in predetermined intervals such that the insertion groove is segmented.

17. The disc driving device of claim 13, wherein the outward inwall of the insertion groove is curved such that an open part of the insertion groove expands towards an outer side.

18. The disc driving device of claim 13, further comprising a sliding disc covering the insertion groove, the sliding disc supporting the correcting balls such that the correcting balls tilt outwards.

* * * * *